United States Patent
Chaar et al.

(10) Patent No.: US 10,070,166 B2
(45) Date of Patent: *Sep. 4, 2018

(54) GENERATION OF REACH, MIXTURE, AND PRICING UTILIZING A FRAMEWORK FOR AUDIENCE RATING ESTIMATION

(71) Applicant: Turner Broadcasting System, Inc., Atlanta, GA (US)

(72) Inventors: Wassim Samir Chaar, Coppel, TX (US); José Antonio Carbajal Orozco, Atlanta, GA (US); Peter Alexander Williams, Atlanta, GA (US)

(73) Assignee: TURNER BROADCASTING SYSTEM, INC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,586

(22) Filed: Nov. 2, 2015

(65) Prior Publication Data

US 2017/0127110 A1    May 4, 2017

(51) Int. Cl.
*H04N 21/262* (2011.01)
*H04N 21/234* (2011.01)
(Continued)

(52) U.S. Cl.
CPC . *H04N 21/26208* (2013.01); *H04N 21/23424* (2013.01); *H04N 21/2547* (2013.01);
(Continued)

(58) Field of Classification Search
CPC ....... H04N 21/26208; H04N 21/23424; H04N 21/25883; H04N 21/25891; H04N 21/26241; H04N 21/2668; H04N 21/812
See application file for complete search history.

(56) References Cited

U.S. PATENT DOCUMENTS 6,947,450 B2   9/2005 Mangin
8,516,515 B2   8/2013 Zigmond et al.
(Continued)

FOREIGN PATENT DOCUMENTS

WO    2001007985 A2    2/2001

OTHER PUBLICATIONS

Araman, V., Popescu, I., 2010. Media revenue management with audience uncertainty: Balancing upfront and ,pot market sales. Manufacturing & Service Operations Management 2 (12), 190-212.
(Continued)

*Primary Examiner* — Alexander Q Huerta
(74) *Attorney, Agent, or Firm* — Chip Law Group

(57) ABSTRACT

Schedule spot counts for allocations of spots are generated based on a selling title and week combination structure for a pending deal for an advertiser, and simulated spot schedules are generated based on schedule spot counts for the advertiser for a quarter. Estimates of unduplicated audience for new spot schedules are generated based on corresponding attributes for each simulated spot schedule and a proposal for the advertiser's deal is generated based on the unduplicated audience estimates. Half-hour assignments within selling title-weeks are generated based on the schedule spot counts, and are randomly sampled over the quarter to generate the simulated spot schedules. The sampling may be constrained to allow one unit from any simulated spot schedule to air in a half-hour assignment on any given network and selection of half-hour assignments for unit placement are constrained to a specified subset of time, and/or a selling category on networks of interest.

79 Claims, 17 Drawing Sheets

(51) Int. Cl.
  *H04N 21/2547*  (2011.01)
  *H04N 21/258*   (2011.01)
  *H04N 21/2668*  (2011.01)
  *H04N 21/81*    (2011.01)

(52) U.S. Cl.
  CPC . *H04N 21/25883* (2013.01); *H04N 21/25891* (2013.01); *H04N 21/2668* (2013.01); *H04N 21/26241* (2013.01); *H04N 21/812* (2013.01)

(56) References Cited

U.S. PATENT DOCUMENTS

| | | | |
|---|---|---|---|
| 8,544,036 B2* | 9/2013 | Bollapragada | G06Q 10/04 705/14.4 |
| 8,973,023 B1* | 3/2015 | Rao | H04N 21/44222 705/14.44 |
| 2003/0188308 A1 | 10/2003 | Kizuka | |
| 2005/0171897 A1* | 8/2005 | Forsythe | G06Q 20/102 705/37 |
| 2006/0259455 A1 | 11/2006 | Anderson et al. | |
| 2007/0033623 A1 | 2/2007 | Fredrickson et al. | |
| 2007/0156525 A1* | 7/2007 | Grouf | G06Q 30/00 705/14.61 |
| 2007/0204310 A1 | 8/2007 | Hua et al. | |
| 2007/0288979 A1 | 12/2007 | Yen | |
| 2008/0189178 A1 | 8/2008 | Schepers et al. | |
| 2008/0189734 A1* | 8/2008 | Schepers | G06Q 10/0631 725/32 |
| 2008/0250447 A1 | 10/2008 | Rowe et al. | |
| 2008/0263578 A1 | 10/2008 | Bayer et al. | |
| 2008/0263583 A1 | 10/2008 | Heath | |
| 2009/0006145 A1* | 1/2009 | Duggal | G06Q 30/02 705/6 |
| 2009/0070211 A1* | 3/2009 | Gonen | G06Q 30/02 705/14.1 |
| 2009/0106082 A1 | 4/2009 | Senti et al. | |
| 2009/0150224 A1* | 6/2009 | Lu | G06Q 30/02 705/7.29 |
| 2009/0254932 A1* | 10/2009 | Wang | H04N 7/17318 725/14 |
| 2010/0042496 A1 | 2/2010 | Wang et al. | |
| 2010/0088719 A1* | 4/2010 | Hawkins | H04H 20/14 725/34 |
| 2010/0146542 A1 | 6/2010 | Weihs et al. | |
| 2011/0078740 A1 | 3/2011 | Bolyukh et al. | |
| 2011/0119136 A1* | 5/2011 | Eldreth | G06Q 30/02 705/14.69 |
| 2011/0161162 A1* | 6/2011 | Ketchum | G06Q 30/02 705/14.43 |
| 2011/0288907 A1 | 11/2011 | Harvey et al. | |
| 2012/0042338 A1* | 2/2012 | Kitts | H04N 21/25866 725/35 |
| 2012/0167125 A1 | 6/2012 | Grubb | |
| 2013/0097629 A1* | 4/2013 | Popescu | H04N 21/23424 725/32 |
| 2013/0205339 A1* | 8/2013 | Haberman | H04N 21/812 725/35 |
| 2013/0219427 A1* | 8/2013 | Zundel | H04N 21/262 725/32 |
| 2013/0254787 A1* | 9/2013 | Cox | G06Q 30/02 725/13 |
| 2014/0006118 A1* | 1/2014 | Charania | G06Q 10/00 705/14.4 |
| 2014/0046661 A1 | 2/2014 | Bruner | |
| 2014/0082660 A1* | 3/2014 | Zhang | H04N 21/258 725/32 |
| 2014/0109123 A1 | 4/2014 | Balakrishnan et al. | |
| 2015/0089540 A1 | 3/2015 | Kitts et al. | |
| 2015/0186403 A1* | 7/2015 | Srivastava | G06F 17/30303 707/692 |
| 2015/0348091 A1 | 12/2015 | Haberman et al. | |
| 2015/0373387 A1* | 12/2015 | Chaar | H04N 21/26208 725/35 |
| 2016/0117718 A1* | 4/2016 | Hood | G06Q 30/0247 725/14 |
| 2016/0357362 A1 | 12/2016 | Gauci et al. | |

OTHER PUBLICATIONS

Bertsimas, D., Tsitsiklis, J., 1997. Introduction to Linear Optimization. Athena Scientific, Belmont, Massachusetts.
Bollapragada, S., Bussieck, M., Mallik, S., 2004. Scheduling commercial videotapes in broadcast television. Operations Research 52 (5), 679-689.
Bollapragada, S., Cheng, H., Phillips, M., Scholes, M., Gibbs, T., Humphreville, M., 2002. Nbc's optimization systems Increase its revenues and productivity. Interfaces 32 (1), 47-60.
Bollapragada, S., Garbiras, M., 2004. Scheduling commercials on broadcast television. Operations Research 52 (3), 337-345.
Danaher, P., Dagger, T., 2012. Using a nested legit model to forecast television ratings. International Journal of Forecasting 28 (3), 607-622.
Danaher, P., Dagger, T., Smith, M., 2011. Forecasting television ratings. International Journal of Forecasting 27 (4), 1215-1240.
Horen, J., 1980. Scheduling of network television programs. Management Science 26 (4), 354-370.
International Search Report and the Written Opinion of the International Searching Authority, or the Declaration, in International application No. PCT/US12/59857, dated Jan. 4, 2013. (11 pages).
Reddy, S., Aronson, J., Stam, A., 1998. Spot: Scheduling programs optimaly for television. Management Science 44 (1), 83-102.
Notice of Allowance in U.S. Appl. No. 14/842,799 dated Apr. 17, 2018.
Office Action in U.S. Appl. No. 14/842,808 dated Mar. 21, 2018.
Notice of Allowance in U.S. Appl. No. 14/842,799 dated May 10, 2018.
Notice of Allowance in U.S. Appl. No. 14/842,799 dated Jun. 15, 2018.
Non-Final Office Action in U.S. Appl. No. 15/865,716 dated Jul. 23, 2018.

* cited by examiner

Flight: 10/01/2015-10/15/2015
Max. Unit Allocation to Selling Title (ST): 6
Allocation Bins: 2
Max. Schedule Total Units: 10

| Unit Allocation Schedule 602 | | | | % Allocation Schedule 604 | | |
|---|---|---|---|---|---|---|
| ST1 | ST2 | ST3 | Total Units | ST1 | ST2 | ST3 |
| 2 | 0 | 0 | 2 | 100% | 0% | 0% |
| 0 | 2 | 0 | 2 | 0% | 100% | 0% |
| 0 | 0 | 2 | 2 | 0% | 0% | 100% |
| 4 | 0 | 0 | 4 | 100% | 0% | 0% |
| 2 | 2 | 0 | 4 | 50% | 50% | 0% |
| 0 | 4 | 0 | 4 | 0% | 100% | 0% |
| 2 | 0 | 2 | 4 | 50% | 0% | 50% |
| 0 | 2 | 2 | 4 | 0% | 50% | 50% |
| 0 | 0 | 4 | 4 | 0% | 0% | 100% |
| 6 | 0 | 0 | 6 | 100% | 0% | 0% |
| 4 | 2 | 0 | 6 | 67% | 33% | 0% |
| 2 | 4 | 0 | 6 | 33% | 67% | 0% |
| 0 | 6 | 0 | 6 | 0% | 100% | 0% |
| 4 | 0 | 2 | 6 | 67% | 0% | 33% |
| ... | ... | ... | ... | ... | ... | ... |

Possible Allocations of Units 606

FIG. 6

GENERATION OF REACH, MIXTURE, AND PRICING UTILIZING A FRAMEWORK FOR AUDIENCE RATING ESTIMATION

CROSS-REFERENCE TO RELATED APPLICATIONS/INCORPORATION BY REFERENCE

This application makes reference to: U.S. application Ser. No. 14/842,799, which was filed on Sep. 1, 2015; U.S. application Ser. No. 14/842,808, which was filed on Sep. 1, 2015; U.S. application Ser. No. 14/842,817, which was filed on Sep. 1, 2015; and U.S. application Ser. No. 14/930,559, which is filed concurrently herewith.

Each of the above referenced patent application and patent is hereby incorporated herein by reference in its entirety.

FIELD OF TECHNOLOGY

Certain embodiments of the disclosure relate to targeting of spots. More specifically, certain embodiments of the disclosure relate to a methods, systems, and apparatus for generation of reach, mixture, and pricing utilizing a framework for audience rating estimation.

BACKGROUND

The process of creating proposals for a linear media plan for advertisers is iterative and time consuming, and is usually limited to a single network. The process of scheduling linear media advertisement spots into commercial breaks tends to be tedious and prone to errors. While some systems are available to receive an advertiser's order for the placement of spots into commercial breaks, these products either simply try to fill empty holes that exist within already scheduled commercial breaks on a first come, first placed basis, or do not address all requirements associated with the commercials. As a result, the systems currently available typically fail to honor all the constraints and requirements for each of the spots.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for generation of reach, mixture, and pricing utilizing a framework for audience rating estimation, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 6 is a diagram that illustrates an exemplary allocation of simulated spots based on selling title, maximum allocation to selling title, and maximum total units, in accordance with an exemplary embodiment of the disclosure.

FIG. 9 is a conceptual diagram illustrating an example of a hardware implementation for a television advertisement management system employing a processing system for audience proposal creation and spot scheduling utilizing a

DETAILED DESCRIPTION OF THE DISCLOSURE

Figure 1A:
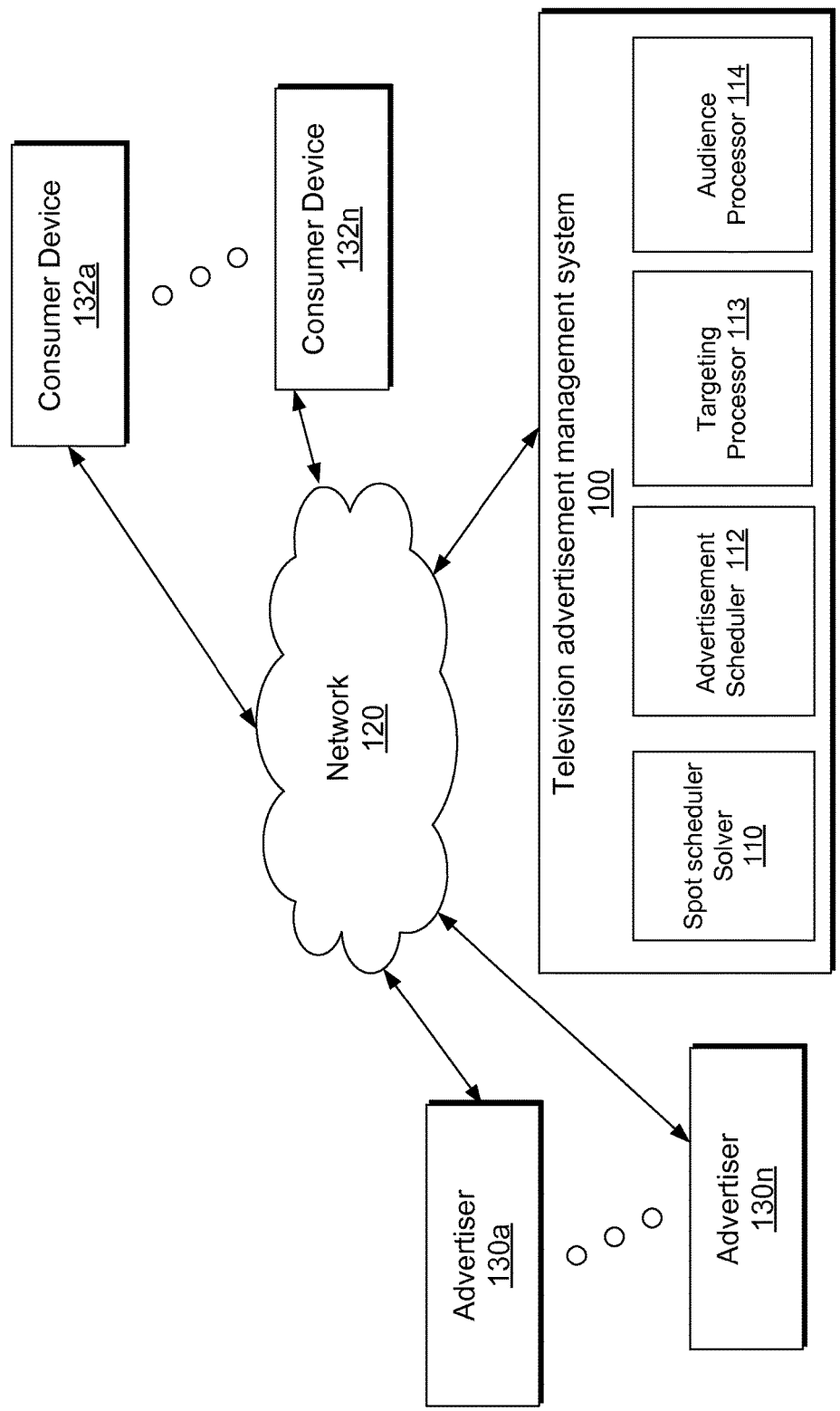
FIG. 1A is a block diagram that illustrates an exemplary system for receiving and processing spot scheduling orders, in accordance with an exemplary embodiment of the disclosure.

Certain embodiments of the disclosure may be found in a method and system for generation of reach, mixture, and pricing utilizing a framework for audience rating estimation. The framework for audience rating estimation may also be referred to as a framework or model for audience estimation or model for audience rating estimation. Traditionally, advertisement in television media has been measured by the gross number of people within a specific demographic (age range plus gender), and does not typically include a reach component. Nowadays, advertisers want to create more focused advertising campaigns that target better the customers that will be exposed to them. The advertisers may also be interested in how much reach their campaign may be receiving. The process of creating proposals for a linear media plan for advertisers is iterative and time consuming, is usually limited to individual networks, and is focused on measuring the overall value to the advertiser in terms of two main metrics: overall budget, and demo CPM (cost per thousand impressions within the advertiser primary target demographic). The combination of these two metrics will yield or give a number of demo guaranteed impressions that the broadcaster has to deliver. Current systems cannot accommodate distributing units across selling titles in multiple networks at the same time, nor can they operate to process impressions from more targeted audience segments which are smaller than broader demographics expressed in terms of age and gender. Additionally, current systems do not typically include a reach component. Throughout the disclosure, whenever reference is made to audience or guaranteed impressions, it should be assumed that such reference implies gross audience, which is the total views and may include duplicated views.

Various embodiments of the disclosure may comprise a hardware advertisement management system that communicates with a plurality of advertiser order generation systems and electronically receives, via a communication network, deals comprising orders from advertisers. The hardware advertisement management system may generate schedule spot counts for allocations of spots based on a selling title and week combination structure for a pending deal for an advertiser, and a plurality of simulated spot schedules are generated based on the schedule spot counts for the advertiser for a quarter. The schedule spot counts may be generated based on historical information for possible allocations of the spots. Estimates of unduplicated audience for new spot schedules may be generated based on corresponding attributes for each of the plurality of simulated spot schedules and a proposal for the deal for the advertiser is generated based on the estimates of unduplicated audience. Half-hour assignments within selling title-weeks may be generated based on the schedule spot counts, and the half-hour assignments are randomly sampled over the quarter to generate the plurality of simulated spot schedules. For each of the plurality of simulated spot schedules, each random schedule resulting from the random sampling within the half-hour assignments over the quarter provides schedule characteristics, schedule statistics, and a corresponding audience. The sampling may be constrained to allow one unit from any simulated spot schedule to air in a half-hour assignment on any given network. The selection of half-hour assignments for unit placement may be constrained to a specified subset of time, and/or a selling category on networks of interest. Simulated spot statistics may be computed or generated for each of the plurality of simulated spot schedules based on the corresponding attributes. The simulated spot statistics comprises at least one of unduplicated viewers and panel weights, spot schedule gross rating points for target or demographic audience, spot schedule unit count, spot schedule length (in days), spot schedule separation, day of week distribution, time of day distribution, and network and selling title distribution. In accordance with another aspect of the disclosure, the advertisement management system may determine a target cost per thousand (CPM) baseline and a demographics CPM baseline for the pending deal for the advertiser in which audience spots will be offered, and may establish parameters for the pending deal for the advertiser. Constraints to be imposed on the pending deal may be determined based on a target CPM reduction goal, a demographics CPM cap, and established parameters for the pending deal, and rates may be generated by selling title for each selling title of a plurality of selling titles, for each week of a plurality of weeks for a duration of the pending deal, and for each network of a plurality of networks, for the pending deal for the advertiser, based on the constraints. Concurrent with the establishing of the parameters, the determining of the constraints, and the generating of the rates by selling title, target audience rating estimates may be acquired based on the target CPM reduction goal, and the demographics CPM cap for the plurality of networks. A distribution of the audience spots is generated across the plurality of selling titles, the plurality of weeks, and the plurality of networks based at least in part on the target audience rating estimates, reach estimates, a budget for the pending deal, the generated rates by selling title, and available inventory per selling title-weeks, and the proposal may be generated based on the distribution. Audience spots may be scheduled across one or more networks for selling title-weeks based on the generated distribution. The parameters for the pending deal may comprise the budget, the target CPM reduction goal, the demographics CPM cap, and demographics rates per selling title to be charged per spot for the pending deal for the advertiser. The distribution of the audience spots may be generated utilizing a distribution framework, and inputs to the distribution framework comprise the budget, the target CPM reduction goal, the demographics CPM cap, the estimates of unduplicated audience, estimates of gross audience, and one or more of a maximum number of units to be allocated per selling title-week, a limit on the total number of units in the pending deal, a limit on the number of impressions and/or units percentages by network or selling title, a limit on rate increase, and an indication of whether to increase the rates in the same proportion.

FIG. 1A is a block diagram that illustrates an exemplary system for receiving and processing spot scheduling orders, in accordance with an exemplary embodiment of the disclosure. Referring to FIG. 1A, there is shown a television advertisement scheduling system 100 that is communicatively coupled to advertiser order generation systems 130a, . . . , 130n through a network 120. Consumer devices 132a, . . . , 132n are communicatively coupled to the network 120. The television advertisement scheduling system 100 may comprise a spot scheduler solver 110, an advertisement scheduler 112, a targeting processor 113, and an audience processor 114.

The network 120 may be any kind of network, or a combination of various networks, and it is shown illustrating the communication that may occur between the advertiser order generation systems 130a, . . . , 130n and the television advertisement scheduling system 100. For example, the network 120 may comprise one or more of a cable television network, the Internet, a satellite communication network, a wide area network (WAN), a medium area network (MAN), and a local area network (LAN).

The television advertisement scheduling system 100 may be operated by a broadcasting company and may comprise a spot scheduler solver 110. The broadcast company may be operable to multicast content via a plurality of channels, for example, traditional over-the-air broadcast channels, cable television networks, satellite communication networks, the Internet, and/or other content delivery networks. The spot scheduler solver 110 may comprise suitable logic, circuitry, code, and/or interfaces that may be operable to receive orders from one or more of the advertiser order generation systems 130a, . . . , 130n to place advertisements spots into one or more commercial breaks that occur during television programming broadcast. That is, the spot scheduler solver 110 may be utilized to determine the appropriate scheduling of advertisement spots to produce a commercial break schedule according to the information provided by the advertiser order generation systems 130a, . . . , 130n. The advertiser order generation systems 130a, . . . , 130n may place orders with the broadcasting company that include information about the type of spots to be broadcast, the number of spots to be broadcast, and when should the spots be aired. In this regard, the advertiser order generation systems 130a, . . . , 130n may electronically book spots to a selling title (ST), and within the selling title there are constraints. The advertiser order generation systems 130a, . . . , 130n may provide multiple orders, which need not be submitted at the same time. Therefore, the spot scheduler solver 110 may continuously receive orders with new or additional spots to be placed and may need to update any previously determined commercial break schedule to accommodate the constraints and requirements of those spots already placed and of the new spots being received.

The television advertisement scheduling system 100 may have a cutoff after which orders submitted by the advertiser order generation systems 130a, . . . , 130n may not be considered by the spot scheduler solver 110 when preparing a next commercial break schedule. A commercial break schedule may include a final or complete schedule of the spots that are to appear during a specified period of television programming such as hours, days, weeks, or a combination thereof.

Various embodiments of the disclosure, the television advertisement scheduling system 100, may comprise a spot scheduler solver 110 and an advertisement scheduler 112. Although the spot scheduler solver 110 and the advertisement scheduler 112 are illustrated as separate entities, they may be integrated as a single entity in which the advertisement scheduler 112 may be enabled or disabled utilizing, for example, one or more parameters. The television advertisement scheduling system 100 may be operable to electronically receive, via the communication network 120, deals comprising advertisers orders from the plurality of advertiser order generation systems 130a, . . . , 130n. The spot scheduler solver 110 may be operable to receive an advertiser's order to place one or more spots into one or more commercial breaks. The advertiser's order comprises airing constraints and placement requirements corresponding to the one or more spots, and each of the one or more commercial breaks comprises a plurality of inventory buckets. The airing constraints corresponding to each of the one or more spots comprise one or more of network constraints, selling title constraints, inventory type constraints, allowable date and time constraints, and advertiser conflict constraints. The placement requirements corresponding to each of the one or more spots comprise one or more of associative constraints, position constraints, time separation constraints, franchise and/or title exclusion constraints, and spot pinning constraints. The associative constraints define the positioning of any two or more spots relative to each other within the same one of the at least one of the plurality of inventory buckets or in adjacent inventory buckets. The position constraints define the positioning of any one spot in one of the at least one of the plurality of inventory buckets and/or in a commercial break.

A position of each of the plurality of inventory buckets within each of the one or more commercial breaks may define a sequencing order of each of the inventory buckets within each of the one or more commercial breaks, and each of the plurality of inventory buckets comprise a corresponding inventory type that indicates a type of content in each of the plurality of inventory buckets. The spot scheduler solver 110 may be operable to assign each of the one or more spots to at least one of the plurality of inventory buckets that are within each of the one or more commercial breaks based on the airing constraints and placement requirements. The spot scheduler solver 110 may be operable to match the characteristics of the assigned at least one of the plurality of inventory buckets that are within each of the one or more commercial breaks with the airing constraints and requirements of each of the one or more spots. The spot scheduler solver 110 may be operable to rank the one or more spots that are within each of the assigned at least one of the plurality of inventory buckets that are within each of the one or more commercial breaks based on the matching such that the airing constraints and placement requirements corresponding to the one or more spots are fulfilled. The spot scheduler solver 110 may be operable to reshuffle the one or more spots that are within each of the assigned at least one of the plurality of inventory buckets that are within each of the one or more commercial breaks. When at least one of the one or more spots are not assigned to the at least one of the plurality of inventory buckets that are within each of the one or more commercial breaks because of conflicts, the spot scheduler solver 110 may be operable to perform a prioritization scheme to complete the assignment of the one or more spots that are not assigned. The spot scheduler solver 110 may be operable to prioritize the spots based on arrival lead time such that all spots for a particular order are given same priority, and priorities are chosen such that a sum of all priorities post a certain arrival time is less than a priority on any spot prior to the certain arrival time. The spot scheduler solver 110 may also be operable to maximize the sum of the rates corresponding to the one or more spots. The spot scheduler solver 110 may also be operable to maximize the spread of days in which the one or more spots occur over the duration of the commercial break schedule. The spot scheduler solver 110 may be operable to generate a commercial break schedule based on the completed assignment of the one or more spots that are not assigned. It should readily be understood by one of skill in the art that other metrics may be utilized without departing from the spirit and scope of the various embodiments of the disclosure.

The spot scheduler solver 110 may also be operable to receive an additional advertiser's order to place one or more additional spots into the one or more commercial breaks, wherein the additional advertiser's order comprises constraints and placement requirements corresponding to the one or more additional spots. The spot scheduler solver 110 may also be operable to assign each of the one or more spots and the one or more additional spots to at least one of the plurality of inventory buckets within the one or more commercial breaks based on the corresponding constraints and placement requirements. When at least one of the one or more spots and the one or more additional spots is not assigned because of conflicts, the spot scheduler solver 110 may also be operable to perform a prioritization scheme to complete the assignment of the at least one spot that is not assigned. The spot scheduler solver 110 may also be operable to modify the generated commercial break schedule based on the completed assignment of the at least one spot that is not assigned. The spot scheduler solver 110 may be operable to communicate the generated commercial break schedule to the advertisement scheduler 112 for processing.

The advertisement scheduler 112 may be operable to receive the generated commercial break schedule, and determine a current indexing representative of the liability per pending spot for one or more of the deals which are guaranteed on demographic impressions. The advertisement scheduler 112 may be operable to reshuffle and prioritize the placement of the one or more spots based on one or more metrics such as a current indexing of the one or more deals in order to minimize liability associated with the one or more deals. The current indexing represents the projected liability per pending spot of a given deal and is determined based on what has already been aired, and what will be aired in the future. The reshuffling may be based on a forecast of expected demo viewership associated with the one or more deals. The advertisement scheduler 112 may be operable to generate a finalized commercial break schedule based on the reshuffling and apply the finalized schedule to the log. It should readily be understood by one of skill in the art that the other metrics other than the current indexing, which represents the projected liability per pending spot, may be utilized without departing from the spirit and scope of the various embodiments of the disclosure.

In accordance with various embodiments of the disclosure, an advertisement management system 100, which comprises a spot scheduler solver 110 and an advertisement scheduler 112, is operable to communicate with a plurality of advertiser order generation systems 130a, . . . , 130n, and electronically receives, via a communication network 120, deals comprising advertiser orders. The advertisement scheduler 112 receives a commercial break schedule generated from a completed assignment of one or more spots, wherein the one or more spots correspond to the deals comprising the advertiser orders to place the one or more spots into one or more commercial breaks in the commercial break schedule based on constraints and placement requirements. The advertisement scheduler 112 may determine a current indexing for one or more of the deals which are guaranteed on demographic impressions, and reshuffles the placement of the one or more spots based on the current indexing of the one or more deals in order to minimize liability associated with the one or more deals. The reshuffling is based on a forecast of expected viewership associated with the one or more deals. The reshuffling of the placement of the one or more spots is done across one or more channels airing the one or more spots. The advertisement scheduler 112 may generate a finalized commercial break schedule based on the reshuffling. The expected viewership may be forecasted for a particular period based in the status of prior logs. As an example, and without limitation, the expected viewership may be forecasted based on the status of the prior logs for an upcoming 7-day period.

The advertisement scheduler 112 may update a current forecast of expected demo viewership at the end of the particular period based on actual ratings for a prior week, which may be derived at last in part from Nielsen ratings and/or other data sources. The advertisement scheduler 112 may maximize delivery for candidate spots that are under-delivering (that is, underperforming deals or deals that are not pacing as expected, where pacing is a computation of cumulative demographics guaranteed so far, that is, at a particular point in time), and reshuffle the placement of the one or more spots such that the candidate spots get maximum delivery in order to minimize the liability. For example, the advertisement scheduler 112 may determine or identify candidate spots with liability above a certain value such as a threshold value, which indicates that the spots are not pacing as expected or under-delivering, and may reshuffle the placement of the one or more spots such that the candidate spots achieve maximum delivery, thereby minimizing liability. The candidate spots may be determined or identified based on their current delivery value. The advertisement scheduler 112 may determine each demographic for each of the one or more spots and generate, for each demographic, an estimate of the expected viewership associated with the one or more spots.

The advertisement scheduler 112 may generate the estimate of the expected viewership for specified time intervals. The time intervals may be, for example, 30-minute time intervals. The advertisement scheduler 112 may determine a current indexing for each of a plurality of the deals which are guaranteed on demographic impressions, and provide preferential treatment to placement of the one or more spots for one or more of the plurality of deals having greatest liability based on the determined current indexing when performing the reshuffling. The advertisement scheduler 112 may modify the forecast of expected demo viewership associated with the one or more deals based on a weighting factor, which may be updatable. The advertisement scheduler 112 may update the weighting factor over time to improve the current indexing of the one or more deals over time.

The targeting processor 113 may comprise suitable logic, circuitry, and interfaces that may be operable to execute code that may be operable to handle the processing of one or more orders in one or more deals that are targeting orders. The targeting processor 113 may be operable to acquire and/or determine target audience rating estimates for targeted spots, and may handle the placement of the targeted spots based on the audience rating estimates. The targeting processor 113 may also be operable to determine a lift goal, determine whether the lift goal may be achieved, and modify the lift goal in instances where the lift goal cannot be achieved.

The audience processor 114 may comprise suitable logic, circuitry, and interfaces that may be operable to execute code to schedule audience spots based on a distribution of audience spots that is generated utilizing a distribution framework. The distribution framework is utilized to generate a distribution of audience spots across a plurality of networks, across a plurality of selling titles, and across a plurality of weeks for the duration of a deal for an advertiser based on various inputs. The units for a particular advertiser order may then be booked based on the distribution for the selling title and weeks combinations across one or more the networks. The selling title and weeks combinations may also be referred to as selling title-weeks combinations, or selling title-weeks. While the targeting processor 113 is operable to target a single network, the audience processor 114 is operable to schedule audience spots across one or more networks for selling title-week combinations.

In accordance with an aspect of the disclosure, each of the advertisement scheduler 112, the targeting processor 113, or the audience processor 114 may operate independently. In another aspect of the disclosure, any two of the advertisement scheduler 112, the targeting processor 113, and/or the audience processor 114 may operate concurrently. In other aspects of the disclosure, the advertisement scheduler 112, the targeting processor 113, and the audience processor 114 may also operate concurrently, or may not operate at all. In this regard, in instances when the advertisement scheduler 112, the targeting processor 113, and the audience processor 114 do not operate, then only the spot scheduler solver 110 operates.

Reach may generally be defined as the cumulative number of unique, unduplicated, or original impressions. These impressions may be either demographic impressions or target impressions. Consider the following table for an advertisement campaign with three (3) spots.

TABLE 1

| Ad. Schedule | Spot Reach (000) | Schedule Cumulative Reach (000) | Duplicated Audience (000) |
| --- | --- | --- | --- |
| Spot 1 | 200 | 200 | 0 |
| Spot 2 | 300 | 400 | 100 |
| Spot 3 | 250 | 500 | 150 |
| Gross Audience (000) | | 750 | |
| Schedule Cumulative Reach | | 500 | |
| Schedule Frequency | | 1.5 | |

Referring to Table 1, spot 1 received a total of 200 k views or impressions. The schedule cumulative reach at the end of airing spot 1 is 200 k, and the duplicated audience is 0, since this was the first time spot 1 was aired and all views or impressions are unique. Spot 2 received a total of 300 impressions, of which 100 were duplicated audience (i.e. 200 unduplicated audience). Accordingly, at the end of airing spot 2, the schedule cumulative reach is 400 (200+200). Spot 3 received a total of 250, of which 150 were duplicated audience (i.e. 100 unduplicated audience). Accordingly, at the end of airing spot 3, the schedule cumulative reach is 500 (200+200+100). Hence, the gross audience (GA) is 750 (200+300+250), and the schedule frequency, which represents the average number of units viewed by qualified audience is 1.5.

In the field of television viewership and advertisement, reach may be measured based on various qualifications, namely (1) viewing, and (2) frequency. An example of a viewing qualification is duration, which provides an indication of how long the spot was viewed. Accordingly, viewing may be qualified on exposure to a spot. For example, the duration may indicate a viewer watched the spot for at least, for example, 1 minute. It should be readily understood that durations that are, for example, less than 1 minute, or greater than 1 minute, may be utilized without departing from the spirit and scope of the various embodiments of the disclosure. An example of a frequency qualification may indicate that the viewer viewed at least 2 spots.

In accordance with an embodiment of the disclosure, a network provider may negotiate a deal with an advertiser to guarantee the advertiser a specified reach, which is measured by impressions or views based on the corresponding qualifications. For example, the network provider may guarantee a reach of 1 million impressions to the advertiser for the deal. In order to determine the allocation of spots that will provide the guaranteed reach, the different possible combinations of allocation of spots for each selling title and weeks combinations may be generated. A proposed allocation of spots may be utilized to generate simulated schedules from which a dataset of simulated spot schedules and corresponding attributes (simulated spot schedule attributes) may be generated. A prediction model or reach prediction framework may then be utilized to generate audience reach for new spot schedules based on the dataset. In this regard, the reach prediction framework is fit based on the simulated spot schedules.

Figure 1B:
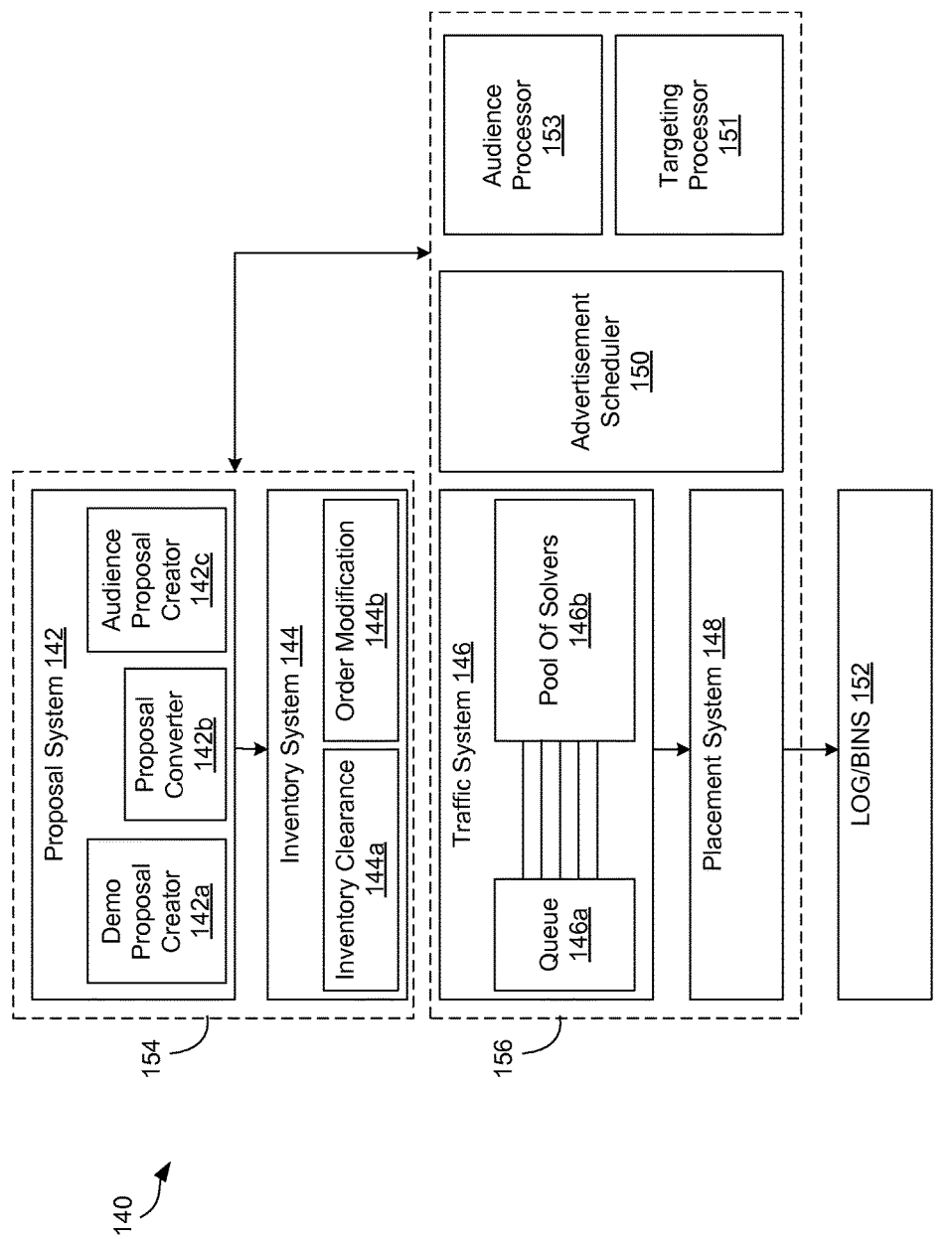
FIG. 1B is a diagram of the television advertisement management system, in accordance with an exemplary embodiment of the disclosure.

FIG. 1B is a diagram of the television advertisement management system, in accordance with an exemplary embodiment of the disclosure. Referring to FIG. 1B, there is shown a television advertisement management system 140, which may be similar to the television advertisement management system 100 of FIG. 1A. The television advertisement management system 140 comprises proposal system 142, inventory system 144, traffic system 146, placement system 148, and advertisement scheduler 150, targeting processor 151, audience processor 153, and LOG/BINS 152. The proposal system 142, and the inventory system 144 may be referred to as an order booking system 154. The traffic system 146, the advertisement scheduler 150, the targeting processor 151, and the audience processor 153 may be referred to as a spot scheduler 156.

The proposal system 142 comprises hardware systems that are operable to create and negotiate proposals with the advertiser order generation systems 130a, . . . , 130n, which are illustrated in FIG. 1A, to produce one or more deals. A negotiated deal may have one or more orders. A demographics only deal may be specific to a single network. However, deals that have an audience component may span a plurality of networks. The proposal system 142 comprises a demographics (demo) proposal creator 142a, a proposal converter 142b, and an audience proposal creator 142c.

The demographics proposal creator 142a may comprise suitable logic, processor and/or circuitry, and interfaces that may enable execution of code to create and negotiate the demographics proposals.

The audience proposal creator 142c may comprise suitable logic, processor and/or circuitry, and interfaces that may be operable to execute code that may be operable to create audience proposals across one or more networks. The audience proposal creator 142c may also be referred to as a hardware audience proposal creator or a hardware audience proposal creator processor. The audience proposal creator 142c may be operable to utilize a distribution framework to generate a distribution of audience spots across selling title-weeks across a plurality of the networks in order to create the audience proposals. The audience proposal creator 142c utilizes the distribution framework to generate a distribution of audience spots across a plurality of networks, across a plurality of selling titles, and across a plurality of weeks for the duration of a deal for an advertiser based on various inputs. The inputs to the distribution framework may comprise, for example, for each network, and for each selling title and week combination, there is a corresponding rate parameter, demographics (demo) impressions or audience for each demo parameter, target impression or audience for each target parameter, and an avails parameter, which represents the air time that is available to allocate spots. The inputs to the distribution framework are described in more detail with respect to, for example, FIG. 8, and its corresponding description.

The audience proposal creator 142c may also be operable to handle proposals for deals that may have a reach component such as reach deals, or mixture deals that have an audience component and a reach component. In this regard, the audience proposal creator 142c may be operable to generate a dataset of simulated schedules and corresponding attributes. The audience proposal creator 142c may utilize a prediction model to generate audience reach for new spot schedules based on the dataset of simulated spot schedules and corresponding attributes. The generated audience reach information may be incorporated in proposals and communicated to the proposal converter 142b.

The proposal converter 142b may comprise suitable logic, processor and/or circuitry, and interfaces that is operable to facilitate execution of code to accept and convert the negotiated proposals to one or more orders. In this regard, the proposal converter 142b is operable to receive and accept negotiated proposals from the demographics proposal creator 142a, and the audience proposal creator 142c and convert the negotiated proposals to one or more orders.

In accordance with an embodiment of the disclosure, in operation, the audience proposal creator 142c may produce a distribution of audience spots utilizing the distribution framework. The distribution of audience spots shows the allocation of audience spots across a plurality of selling titles, across a plurality of weeks corresponding to the duration of a deal, and across a plurality of networks. The audience proposal creator 142c may generate an audience proposal for a pending deal for an advertiser. Accordingly, audience spots may be booked based on the distribution of the audience spots across the selling-title weeks and across the plurality of networks.

The inventory system 144 comprises inventory clearance system 144a, and order modification system 144b. The inventory clearance system 144a is operable to clear the orders based on available inventory. The orders may be cleared, for example, on a first come first serve (FCFS) basis. When an order is received, the order may specify the x units be placed in selling title week A, y units be placed in selling title week B, and z units be placed in selling title week C, for example. Since there may be multiple bookings occurring, the inventory clearance system 144a ensures the availability of the inventory for booking the required units for the order. The order modification system 144b may be operable to change the attributes associated with an order that has already cleared inventory, add one or more units for an order to the inventory, or delete one or more units from inventory.

The traffic system 146 may comprise suitable hardware that may be operable to receive cleared and/or modified orders and queue them for assignment to an available spot scheduler solver. In this regard, the traffic system 146a may comprise a hardware queue 146a, and a plurality of spot scheduler solvers 146b. The queue 146a may be operable to queue cleared and/or modified orders by the traffic system 146. The traffic system 146 may assign the cleared and/or modified orders that are queued in the queue 146a to an available spots scheduler solver in the pool of spot scheduler solvers 146b for spot scheduling. The placement system 148 is operable to place the spots on the logs/bins 152 based on the results from the spot scheduler solvers.

The advertisement scheduler 150 may be operable to receive the generated commercial break schedule, determine a current indexing representative of the liability per pending spot for one or more of the deals which are guaranteed on demographic impressions, reshuffle and prioritize the placement of the one or more spots based on one or more metrics such as a current indexing of the one or more deals in order to minimize liability associated with the one or more deals. The reshuffling may be based on a forecast of expected demo viewership associated with the one or more deals. The advertisement scheduler 150 generates a finalized commercial break schedule based on the reshuffling and applies the finalized schedule to the log.

The targeting processor 151 may handle the processing of targeting orders. In this regard, the targeting processor 151 may be operable to acquire and/or determine target audience rating estimates for targeted spots, and may handle the placement of the targeted spots based on the target audience rating estimates. The targeting processor 151 may also be operable to determine a lift goal, determine whether the lift goal is achievable, and modify the lift goal in instances where the lift goal is not achievable.

The audience processor 153 may handle the audience scheduling operations related to deals. For example, the audience processor 153 may be operable to schedule audience spots based on the distribution of audience spots that is generated or produced by the audience proposal creator 142c based on a distribution framework. The distribution framework is utilized to generate a distribution of audience spots across a plurality of networks, across a plurality of selling titles, and across a plurality of weeks for the duration of a deal for an advertiser based on various inputs. The audience processor 153 may schedule the units for a particular advertiser order based on the distribution for the selling title-weeks combinations across one or more networks In accordance with an exemplary embodiment of the disclosure, the hardware advertisement management system 100 communicates with a plurality of advertiser order generation systems 130a, ..., 130n, and electronically receives, via a communication network, deals comprising orders from advertisers. The audience proposal creator 142c may determine a target CPM baseline and demo CPM baseline for a pending deal for an advertiser in which audience spots will be offered. The audience proposal creator 142c may establish parameters for the pending deal for the advertiser, determine constraints to be imposed on the pending deal based on a target CPM reduction goal, a demographics CPM cap, and the established parameters, and generate rates by selling title for each selling title of a plurality of selling titles, for each week of a plurality of weeks for a duration of pending deal, and for each network of a plurality of networks, for the pending deal for the advertiser, based on the constraints. Concurrent with the establishing of the parameters, the determining of the constraints, and the generating of the rates by selling title, the audience proposal creator 142c may acquire target audience rating estimates based on the target and demo applicable to the advertiser for the plurality of networks. The audience proposal creator 142c may generate a distribution of the audience spots across the plurality of selling titles, the plurality of weeks, and the plurality of networks based at least in part on the target audience rating estimates, a budget for the pending deal, the generated rates by selling title, and available inventory per selling title and weeks combination. The generated distribution satisfies the determined constraints as part of the process of generating the distribution. The audience proposal creator 142c may generate a proposal based on the distribution. The audience processor 153 or 114 may schedule audience spots across one or more networks for selling title and weeks combinations based on the generated distribution.

The generation of the distribution of the audience spots by the audience proposal creator 142c includes generating a new distribution of the audience spots across the plurality of selling titles, the plurality of weeks, and the plurality of networks based on input from the advertiser, and generating a new proposal based on the new distribution. The audience proposal creator 142c may designate the new proposal as a final proposal. The audience processor 153 or 114 may schedule the audience spots across one or more networks for selling title and weeks combinations based on the new distribution.

Exemplary parameters for the pending deal may include the budget, the target CPM reduction goal, the demographics CPM cap, and demographics rates per selling title to be charged per spot for the pending deal for the advertiser. The audience proposal creator 142c may be operable to generate the distribution of the audience spots utilizing a distribution framework. Exemplary inputs to the distribution framework may include the budget, the target CPM reduction goal, and the demographics CPM cap. Other exemplary inputs to the distribution framework may include one or more of a maximum number of units to be allocated per selling title and week combination, a limit on the total number of units in the pending deal, a limit on the number of impressions and/or units percentages by network or selling title, a limit on rate increase, and an indication of whether to increase the rates in the same proportion. The target impressions corresponding to the distribution of the audience spots are guaranteed.

Orders requiring advertisement scheduling may be processed by the advertisement scheduler 150 and placed on the logs/bins 152 based on the results from the advertisement scheduler 150. The advertisement scheduler 150, the targeting processor 151, and/or the audience processor 153 may operate independently, or concurrently. For example: (1) any one of the advertisement scheduler 150, the targeting processor 151, and/or the audience processor 153 may operate independently; (2) any two of the advertisement scheduler 150, the targeting processor 151, and/or the audience processor 153 may operate concurrently; (3) the advertisement scheduler 150, the targeting processor 151, and the audience processor 153 may all operate concurrently; or (4) neither of the advertisement scheduler 150, the targeting processor 151, and the audience processor 153 may operate, and in this case, only the spot scheduler solver 110 operates.

Figure 1C:
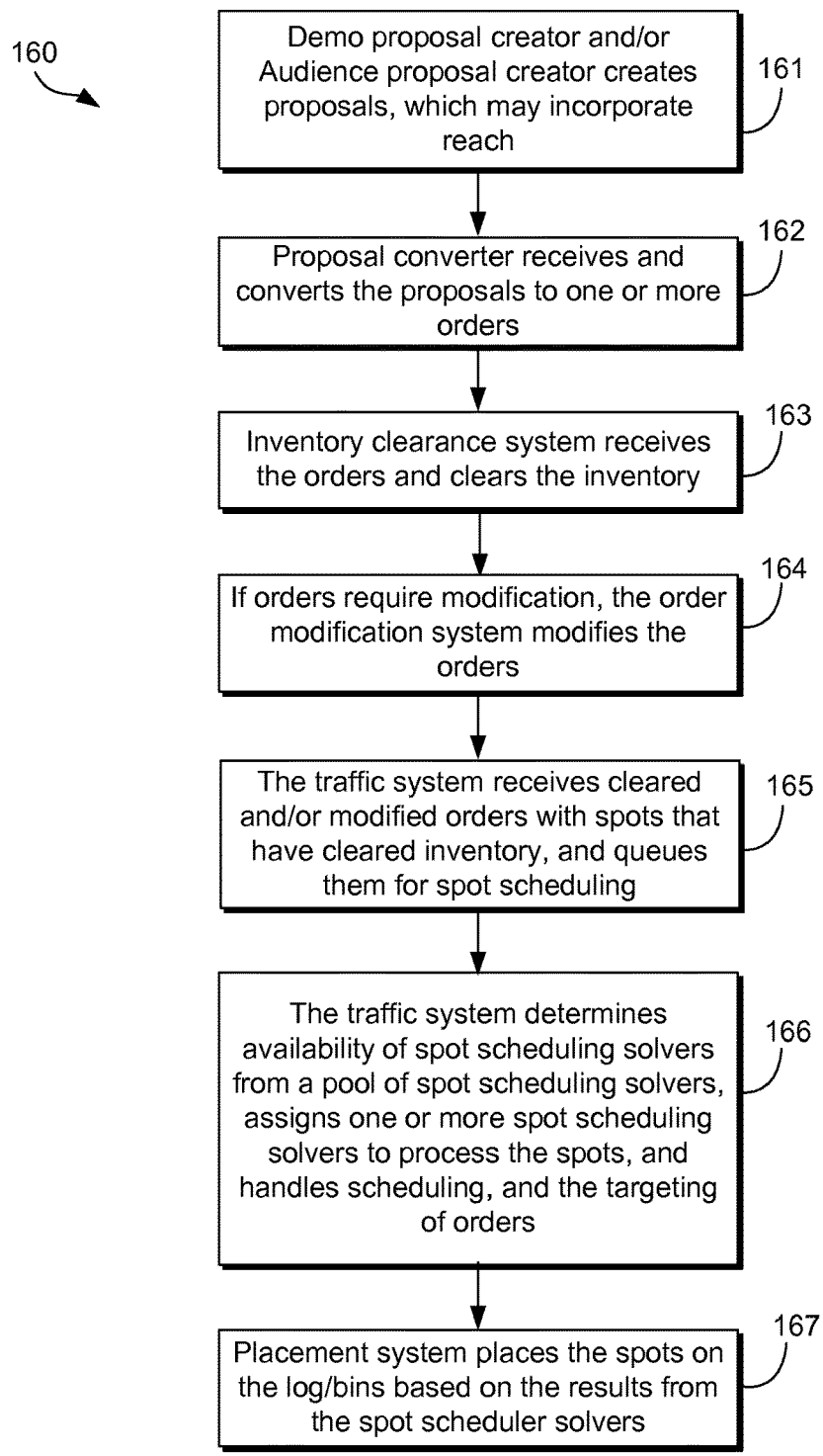
FIG. 1C is a flow chart illustrating high-level operation of the television advertisement management system of FIG. 1B, in accordance with an exemplary embodiment of the disclosure.

FIG. 1C is a flow chart illustrating high-level operation of the television advertisement management system of FIG. 1B, in accordance with an exemplary embodiment of the disclosure. Referring to FIG. 1C, there are shown exemplary operations 161 through 167. At 161, the demo proposal creator 142a and/or the audience proposal creator 142c create proposals, which may incorporate reach. At 162, the proposal converter 142b receives and converts the proposals to one or more orders. At 163, the inventory clearance system 144a receives the orders and clears the inventory. At 164, if orders require modification, the order modification system 144b modifies the orders. At 165, the traffic system 146 receives cleared and/or modified orders with spots that have cleared inventory and queues them in the queue 146a for spot scheduling. At 166, the traffic system 146 determines availability of spot scheduling solvers from a pool of spot scheduling solvers 146b, assigns one or more spot scheduling solvers to process the spots, and handles the scheduling and the targeting of orders. At 167, the placement system 148 places the spots on the log/bins 152 based on the results from the spot scheduler solvers.

Figure 2A:
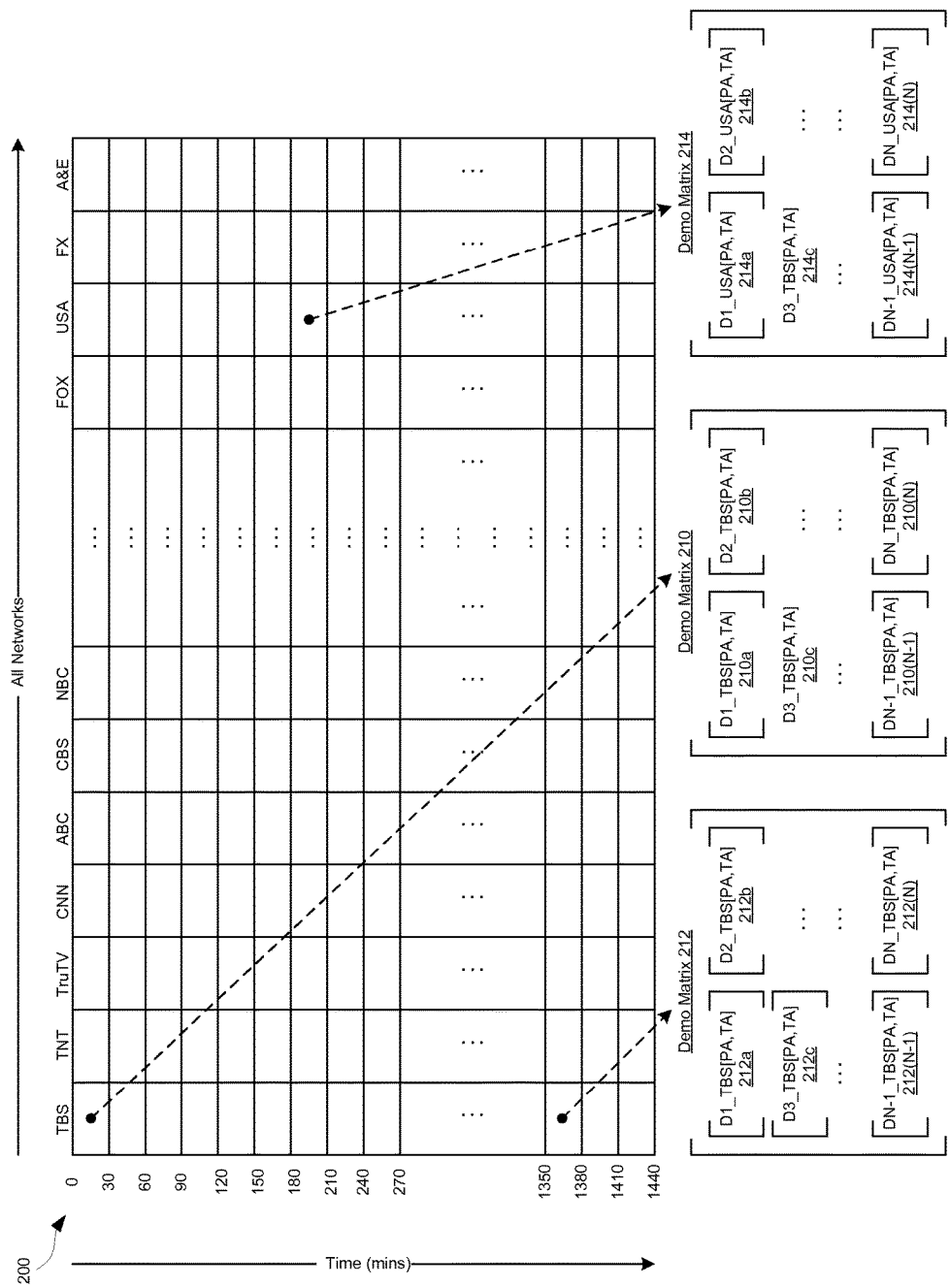
FIG. 2A is a diagram that illustrates a framework demo audience rating estimation for a media system, in accordance with various exemplary embodiments of the disclosure.

FIG. 2A is a diagram that illustrates a framework for demo audience rating estimation for a media system, in accordance with various exemplary embodiments of the disclosure. Referring to FIG. 2A, there is shown an exemplary base matrix 200 comprising a plurality of columns and a plurality of rows. Each of the plurality of columns represents a particular network among all networks, and each of the rows represents the 48 30-minute periods/segments in a day (24-hour period). As illustrated, there are shown exemplary networks, TBS, TNT, TruTV, CNN, ABC, CBS, NBC, . . . , FOX, USA, FX, and A&E.

Each element in the base matrix 200 may be represented by a demo matrix, which comprises a plurality of demo matrix elements, representing all demographics. For example, demo matrix 210 represents all the demographics for TBS network, for the 0-30 ($1^{st}$) 30-minute period. The demo matrix 210 comprises demo matrix elements 210a, 210b, 210c, . . . , 210(N−1), 210N, where N is an integer greater than or equal to 1. Demo matrix element 210a comprises a first demo D1 for TBS, which includes all program attributes (PA), and time attributes (TA), and is collectively represented as D1_TBS[PA,TA]. Demo matrix element 210b comprises a second demo D2 for TBS, which includes all program attributes (PA), and time attributes (TA), and is collectively represented as D2_TBS[PA,TA]. Demo matrix element 210c comprises a third demo D3 for TBS, which includes all program attributes (PA), and time attributes (TA), and is collectively represented as D3_TBS [PA,TA] . . . . Demo matrix element 210(N−1) comprises a (N−1)$^{th}$ demo D(N−1) for TBS, which includes all program attributes (PA), and time attributes (TA), and is collectively represented as DN−1_TBS[PA,TA]. Demo matrix element 210(N) comprises a N$^{th}$ demo D(N) for TBS, which includes all program attributes (PA), and time attributes (TA), and is collectively represented as DN−1_TBS[PA,TA].

The demo matrix 212 represents all the demographics for TBS network, for the 1350-1380 (46$^{th}$) 30-minute period. The demo matrix 212 comprises demo matrix elements 212a, 212b, 212c, . . . , 212(N−1), 212N, where N is an integer greater than or equal to 1. Demo matrix element 212a comprises a first demo D1 for TBS, which includes all program attributes (PA), and time attributes (TA), and is collectively represented as D1_TBS[PA,TA]. Demo matrix element 212b comprises a second demo D2 for TBS, which includes all program attributes (PA), and time attributes (TA), and is collectively represented as D2_TBS[PA,TA]. Demo matrix element 212c comprises a third demo D3 for TBS, which includes all program attributes (PA), and time attributes (TA), and is collectively represented as D3_TBS [PA,TA] . . . . Demo matrix element 212(N−1) comprises a (N−1)$^{th}$ demo D(N−1) for TBS, which includes all program attributes (PA), and time attributes (TA), and is collectively represented as DN−1_TBS[PA,TA]. Demo matrix element 212(N) comprises a N$^{th}$ demo D(N) for TBS, which includes all program attributes (PA), and time attributes (TA), and is collectively represented as DN−1_TBS[PA,TA].

The demo matrix 214 represents all the demographics for USA network, for the 180-210 (7$^{th}$) 30-minute period. The demo matrix 214 comprises demo matrix elements 214a, 214b, 214c, . . . , 214(N−1), 214N, where N is an integer greater than or equal to 1. Demo matrix element 214a comprises a first demo D1 for USA, which includes all program attributes (PA), and time attributes (TA), and is collectively represented as D1_USA[PA,TA]. Demo matrix element 214b comprises a second demo D2 for USA, which includes all program attributes (PA), and time attributes (TA), and is collectively represented as D2_USA[PA,TA]. Demo matrix element 214c comprises a third demo D3 for USA, which includes all program attributes (PA), and time attributes (TA), and is collectively represented as D3_USA

[PA,TA] . . . . Demo matrix element 214(N–1) comprises a (N–1)$^{th}$ demo D(N–1) for USA, which includes all program attributes (PA), and time attributes (TA), and is collectively represented as DN–1_USA[PA,TA]. Demo matrix element 214(N) comprises a N$^{th}$ demo D(N) for USA, which includes all program attributes (PA), and time attributes (TA), and is collectively represented as DN–1_USA[PA,TA].

Each demo matrix element for each network includes program attributes, and time attributes, which may be represented as a matrix [PA,TA]. Exemplary time attributes may comprise the following:

Quarter, Year (if necessary), which may be represented as variables;

Daily seasonality, which may be represented as a linear combination of trigonometric functions;

Day of week (DOW), which may be represent as variables;

Half hour, which may be represented as variables, for example, 8:00-8:30, 8:30-9:00;

Holidays and special events, for example, Super Bowl, Labor Day Sunday and Monday, 4$^{th}$ of July (Independence Day), Christmas Day, and New Year's Eve, and may be represented as variable.

Exemplary program attributes may comprise the following:

Genre by network/competitor:
  a. "light content" (soap, comedy, variety, game, music, reality);
  b. "heavy content" (documentary, drama, current affairs, news, science, travel);
  c. Sports;
  d. Movies; and
  e. News;
  for each type of competitor (bucket), for example, Broadcast light content, Non-Owned Cable light content;

Repeat/Premiere/Live (from Nielsen)

Duration (in min)

Same program indicator—half hour (hhr) is within same program as previous (calculated)

Lead in genre match—half hour (hhr) starts a program similar with previous hhr's program (calculated), where genre is light, heavy, sports or movies It should be recognized by those skilled in the art that other time attributes and/or program attributes may be utilized without departing from the spirit and/or scope of the various embodiments of the disclosure.

For a given 30-minute period, the probability of a consumer choosing to watch what is on a particular channel is a function of what is currently airing on that particular channel, and what the competitors are airing within the same 30-minute period. For example, the probability for a consumer watching TBS network for a given 30-minute period, $P_{hhr,TBS}$ may be represented by the following expression:

$$P_{hhr,TBS} = \frac{e^{\beta_{TBS} \cdot x_{P_{hhr,TBS}}}}{\sum_{i=TBS}^{Others} e^{\beta_i \cdot x_{P_{hhr,i}}}} \quad \text{(equation 1)}$$

where:

x=program attributes and time attributes;

β=vector of weights to be estimated for a particular network e.g. $\beta_{TBS}$=vector of weights to be estimated for TBS.

The program attributes and time attributes may be referred to as covariates, and may be received from one or more entities and/or storage devices that provide media analytical information, for example, Nielsen.

The $P_{hhr,TBS}$ for equation 1 may be simplified and represented as:

$$\ln(\text{Demo}(000)_{hhr,TBS}) = \beta_{TBS} \cdot x_{P_{hhr,TBS}} \quad \text{(equation 2)}$$

In accordance with an exemplary embodiment of the disclosure, equation 2 may be estimated through minimizing squared errors (MSE) utilizing non-linear optimization.

In accordance with various embodiments of the disclosure, the competitor networks may be bucketized, i.e. placed into buckets or bins. The following illustrates exemplary competitor buckets:

Owned competitors—for example, TBS, TNT, ADSM, TruTV, etc are owned by the same entity, and thus compete against each other;

Broadcast competitors—ABC, CBS, NBC, FOX, CW, ION;

Non-Owned cable competitors—USA, Spike, FX, A&E, Lifetime, CMDY; and

All other networks.

The base matrix 200 as illustrated contains data for a single day. The structure of the base matrix 200 may be replicated 365 times and populated with the corresponding program attributes and time attributes for a single year. This resulting structure may be replicated and populated with the corresponding program attributes and time attributes to provide a corresponding plurality of years of data.

Figure 2B:
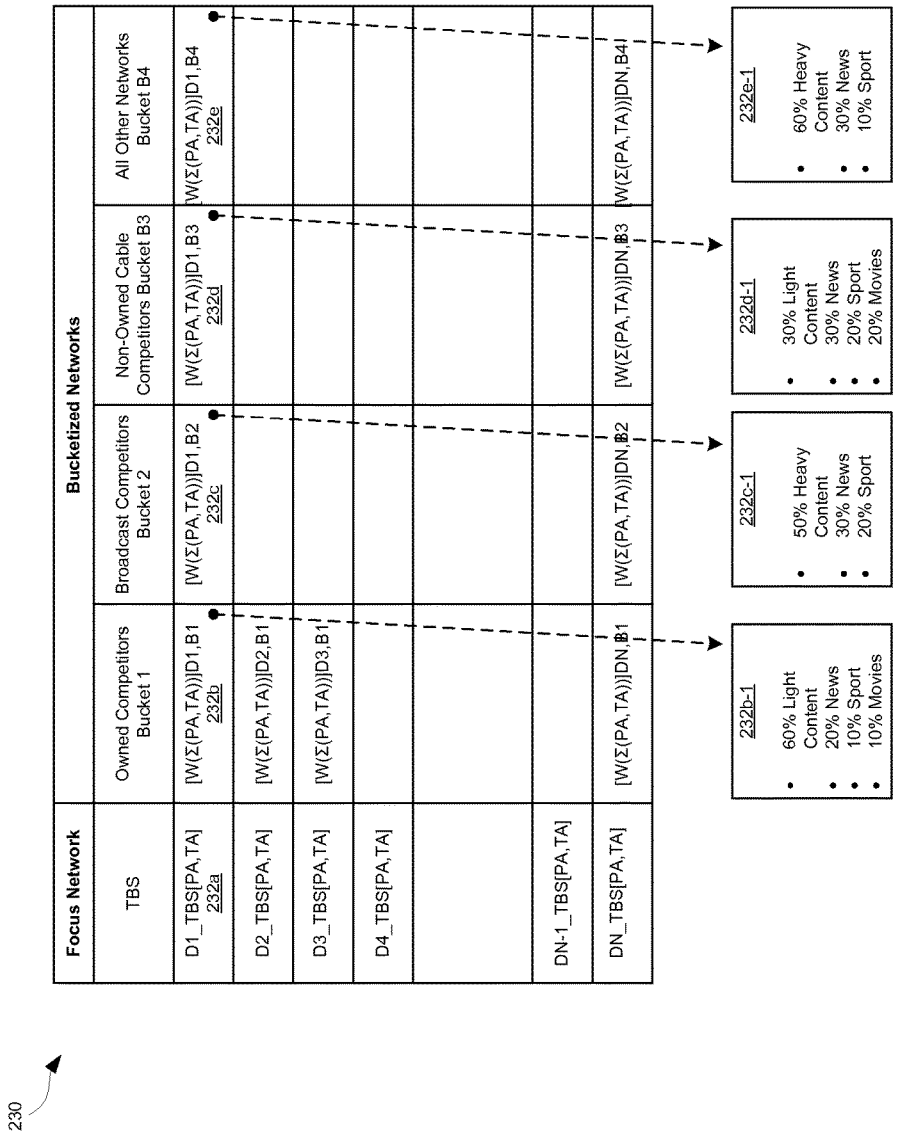
FIG. 2B is a diagram that illustrates a focus network determination for the framework for demo audience rating estimation for the media system of FIG. 2A, in accordance with various exemplary embodiments of the disclosure.

FIG. 2B is a diagram that illustrates a focus determination for the framework for demo audience rating estimation for a media system of FIG. 2A, in accordance with various exemplary embodiments of the disclosure. Referring to FIG. 2B, there is shown an exemplary focus matrix 230 including a focus network, TBS, and the bucketized networks in buckets, B1, B2, B3, and B4. The focus matrix 230 represents information for the 0-30 minute period of the base matrix 200 illustrated in FIG. 2A. A similar matrix may be generated for each remaining time periods for TBS, which are illustrated in FIG. 2A.

Consider the first demo D1 in the 0-30 minute period (FIG. 2A), for TBS, with the program attributes PA, and time attributes TA, collective referenced as D1_TBS[PA,TA], 232*a*. The values for D1_TBS[PA,TA] are acquired from the demo matrix element 210*a*, in FIG. 2A. For the first demo D1, a vector of the sum (Σ(PA,TA)) of program attributes and the time attributes for the each of the owned competitor networks, which are in bucket 1 is determined. The vector of the sum (Σ(PA,TA)) is determined by adding the individual contribution for each owned competitor network in bucket B1, which is found in the row for 0-30 minute (first 30-minute) period of the base matrix 200 illustrated in FIG. 2A, for a period of, for example, 1 year. Since different shows may be presented in the 0-30 minute period, the vector of the sum (Σ(PA,TA)) for bucket B1 is weighted. The resulting weighted vector for the summed attributes of content for the networks in bucket B1, may be represented as [W(Σ(PA,TA))]D1,B1]. An example weighted vector for the summed attributes of content for the networks in bucket B1 may comprise 60% light content, 20% news, 10% sport, and 10% movies, and is represented by reference number 232*b*-1.

Bucket B2 is handled in a similar manner as bucket B1. In this regard, the vector of the sum (Σ(PA,TA)) is determined by adding the individual contribution for each owned competitor network in bucket B2, which is found in the row for 0-30 minute (first 30-minute) period of the base matrix 200 illustrated in FIG. 2A, for a period of, for example, 1 year. Since different shows may be presented in the 0-30 minute period, the vector of the sum (Σ(PA,TA)) for bucket B2 is weighted. The resulting weighted vector for the summed attributes of content for the networks in bucket B1, may be represented as [W(Σ(PA,TA))]D1,B2]. An example weighted vector for the summed attributes of content for the networks in bucket B2 may comprise 50% heavy content, 30% news, and 20% sport, and is represented by reference number 232c-1.

Bucket B3 is handled in a similar manner as buckets B1 and B2. In this regard, the vector of the sum (Σ(PA,TA)) is determined by adding the individual contribution for each owned competitor network in bucket B3, which is found in the row for 0-30 minute (first 30-minute) period of the base matrix 200 illustrated in FIG. 2A, for a period of, for example, 1 year. Since different shows may be presented in the 0-30 minute period, the vector of the sum (Σ(PA,TA)) for bucket B3 is weighted. The resulting weighted vector for the summed attributes of content for the networks in bucket B3, may be represented as [W(Σ(PA,TA))]D1,B3]. An example weighted vector for the summed attributes of content for the networks in bucket B2 may comprise 30% light content, 30% news, 20% sport, and 20% movies, and is represented by reference number 232d-1.

Bucket B4 is handled in a similar manner as buckets B1, B2, and B3. In this regard, the vector of the sum (Σ(PA,TA)) is determined by adding the individual contribution for each owned competitor network in bucket B4, which is found in the row for 0-30 minute (first 30-minute) period of the base matrix 200 illustrated in FIG. 2A, for a period of, for example, 1 year. Since different shows may be presented in the 0-30 minute period, the vector of the sum (Σ(PA,TA)) for bucket B4 is weighted. The resulting weighted vector for the summed attributes of content for the networks in bucket B4, may be represented as [W(Σ(PA,TA))]D1,B3]. An example weighted vector for the summed attributes of content for the networks in bucket B4 may comprise 60% light content, 30% news, and 10% sport, and is represented by reference number 232e-1.

Utilizing the variables generated through the operations described above with respect to FIG. 2A and FIG. 2B, and equation 1 and equation 2, the most common approach is to estimate the parameters of this statistical model (the betas) utilizing maximum likelihood estimation techniques.

This may be repeated for all the demos in the 0-30 minute period, so that each demo may have a corresponding β vector. Once all the demos for the 0-30 minute period are completed, the entire process may be repeated for the second 30-minute period (30-60), and so on until all corresponding values of β for all demos in the $48^{th}$ 30-minute period are completed.

The framework illustrated in FIGS. 2A and 2B may be utilized for predictive modeling to determine viewership for an upcoming quarter. Once the β vector for a particular network is determined, this may be utilized to forecast or predict the viewership for an upcoming quarter for the particular network. In order to forecast the viewership for TBS for the upcoming quarter, the program schedule for the TBS and the program schedule for the competing networks are needed. Assume that today is Apr. 5, 2015, which is roughly the start of the second quarter 2Q15, and that the model illustrated in FIG. 2A and FIG. 2B includes data for the prior four quarters, namely, 2Q14, 3Q14, 4Q14, and 1Q15. Furthermore, it is assumed that all ratings and viewership information, for example, Nielsen data, for all prior periods have been received and are included in the model illustrated in FIG. 2A and FIG. 2B.

While the program schedule for the TBS network for 2Q15 is known, the program schedule for the competitors may not be known. However, it may be assumed that the mix of program for the upcoming quarter is the same as it was for the same quarter in the prior year. Accordingly, an assumption is made that the mix of program for 2Q15 is approximately the same as the mix of program in 2Q14, which may be determined from the bucketized networks as illustrated in FIG. 2B (e.g. 231b-1, 232c-1, 232d-1, 232e-1). If it is known that there is a change to the programming in a particular bucket, then the program mix in the bucket may be adjusted accordingly. This information may be utilized to forecast the viewership for every demo, and for every 30-minute period in the upcoming quarter utilizing the values that were calculated for 13. The entire process may be repeated for other networks in order to forecast viewership for those other networks for the upcoming quarter. Furthermore, the various embodiments of the disclosure are not limited to forecasting the current quarter, Q215. Accordingly, the model presented in FIG. 2A and FIG. 2B may also to utilize to forecast or predict viewership for 3Q15, for example.

Since consumer behavior is constantly changing, the β vector for a particular network may be updated based on these changes in the consumer behavior. Accordingly, for example, once all the data for a quarter has been received, the β vector for each particular network may be updated to reflect the changes in consumer behavior.

Although the various embodiments of the disclosure presented with respect to the model in FIG. 2A and FIG. 2B are utilized to predict the viewership for an owned network, it should be recognized that the disclosure is not limited in this regard. Accordingly, the model in FIG. 2A and FIG. 2B may also be utilized to predict viewership for competitor networks.

The digital age allows individual tracking of consumers by sellers/advertisers since the sellers know the viewers they are interacting with and can more readily learn their habits and preferences. Consumers and viewers are tracked based on online preferences, tracking cookies, Internet browsing habits, and location based services (LBS) to name a few. Based on this knowledge and habits of the consumers and viewers, data from a plurality of data analytics sources may be fused together to provide more granular results. In this regard, analytical information provided for a particular demo may give a breakdown of one or more categories that may fall within that particular demo. For example, within the demo for people age 25-54, P[25-54], at the $39^{th}$ 30-minute period (7:30-8:00 pm), which has a viewership of 1M, 500K of the 1M viewers are cereal buyers. Given such granularity, an advertiser of cereal would be more interested in targeting the 500K cereal buyers rather that the entire 1M viewers.

Although targeting may operate with similar constraints as advertisement scheduling, aspects of targeting may be geared towards targeting segments of a certain population on a more granular level. For example, consider the target [auto intenders], which includes people who intent to by automobiles. The target [Auto intenders] may comprise, a first level of sub-targets, for example, [Ford branded autos], [Toyota branded autos], [Honda branded Autos], and so on. Each of the first level of sub-targets may comprise a second level of sub-targets. For example, target [Ford branded autos] may comprise second level sub-targets [Ford Sedans], [Ford SUVs], [Ford Trucks], and target [Toyota branded autos] may comprise second level sub-targets [Toyota Sedans],

[Toyota SUVs], [Toyota Trucks], [Toyota Cross Overs], and so on. The second level sub-targets [Ford Trucks] may comprise third level sub-targets, for example, [Ford light trucks], and [Ford heavy duty trucks]. This level of granularity enables targeting to zero in on specific segments to provide a certain percentage lift during placement of targeting spots. Additional sub-levels of targets may be employed without departing from the spirit and scope of the disclosure.

The framework illustrated in FIG. 2A, and FIG. 2B may be modified such that the demos D1, D2, D3, . . . , DN may be replaced by targets, and a β vector may be determined for each of the targets and for each of the networks. Exemplary targets may comprise cereal buyers, yogurt buyers, credit card buyers, luxury car buyers, buyers of US made cars, and buyers of foreign made cars. A matrix of the targets may be generated and advertisement may be more efficiently scheduled based on how targeting deals are sold.

Figure 2C:
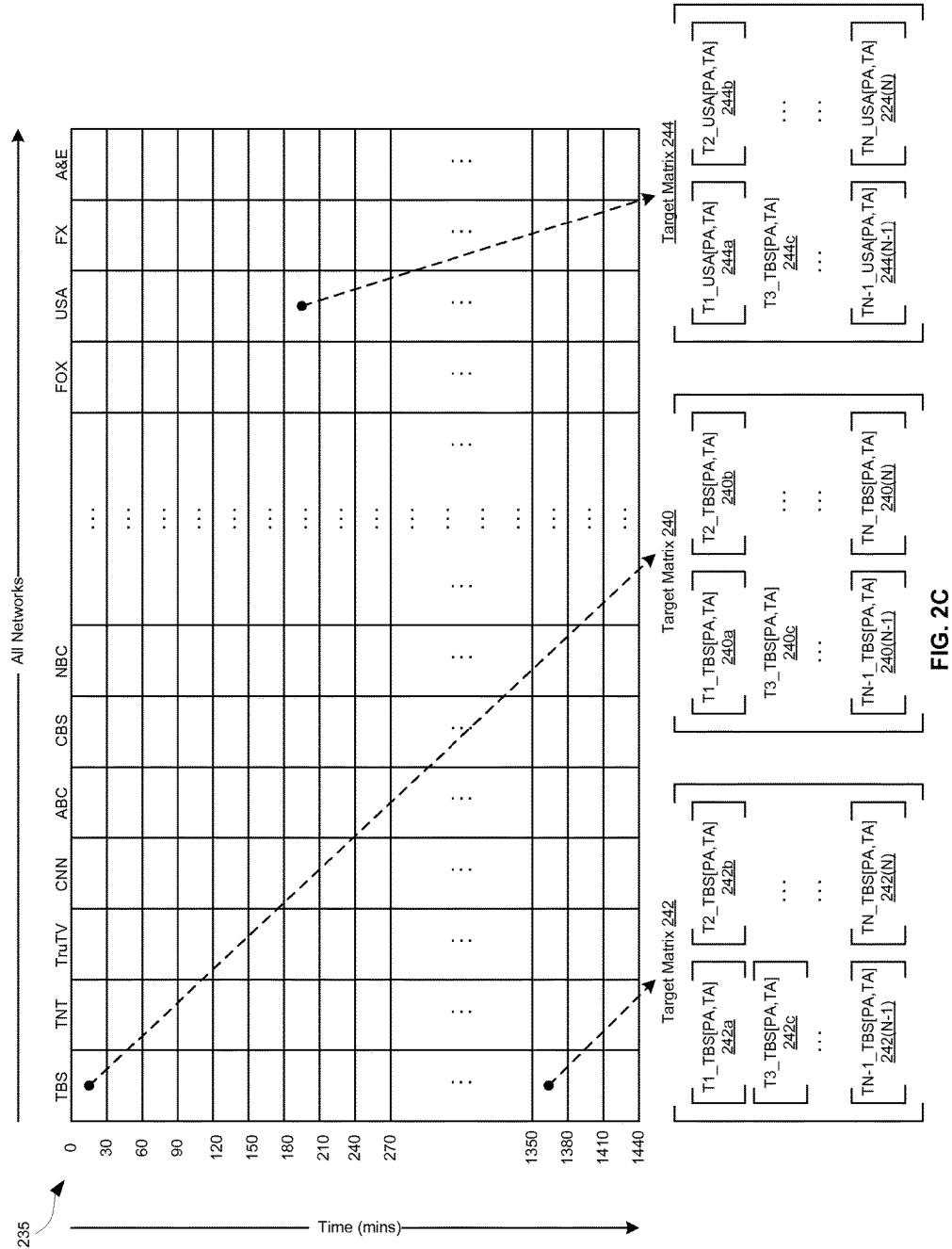
FIG. 2C is a diagram that illustrates an exemplary target matrix, in accordance with various exemplary embodiments of the disclosure.

FIG. 2C is a diagram that illustrates an exemplary target matrix, in accordance with various exemplary embodiment of the disclosure. Referring to FIG. 2C, there is shown target matrix 235, which comprises exemplary target matrix 240, 242, and 244, each having corresponding elements referenced as 240a, 240b, 240c, . . . , 240(N−1), 240(N); 242a, 242b, 242c, . . . , 242(N−1), 242(N); and 244a, 244b, 244c, . . . , 244(N−1), 244(N), respectively.

Figure 2D:
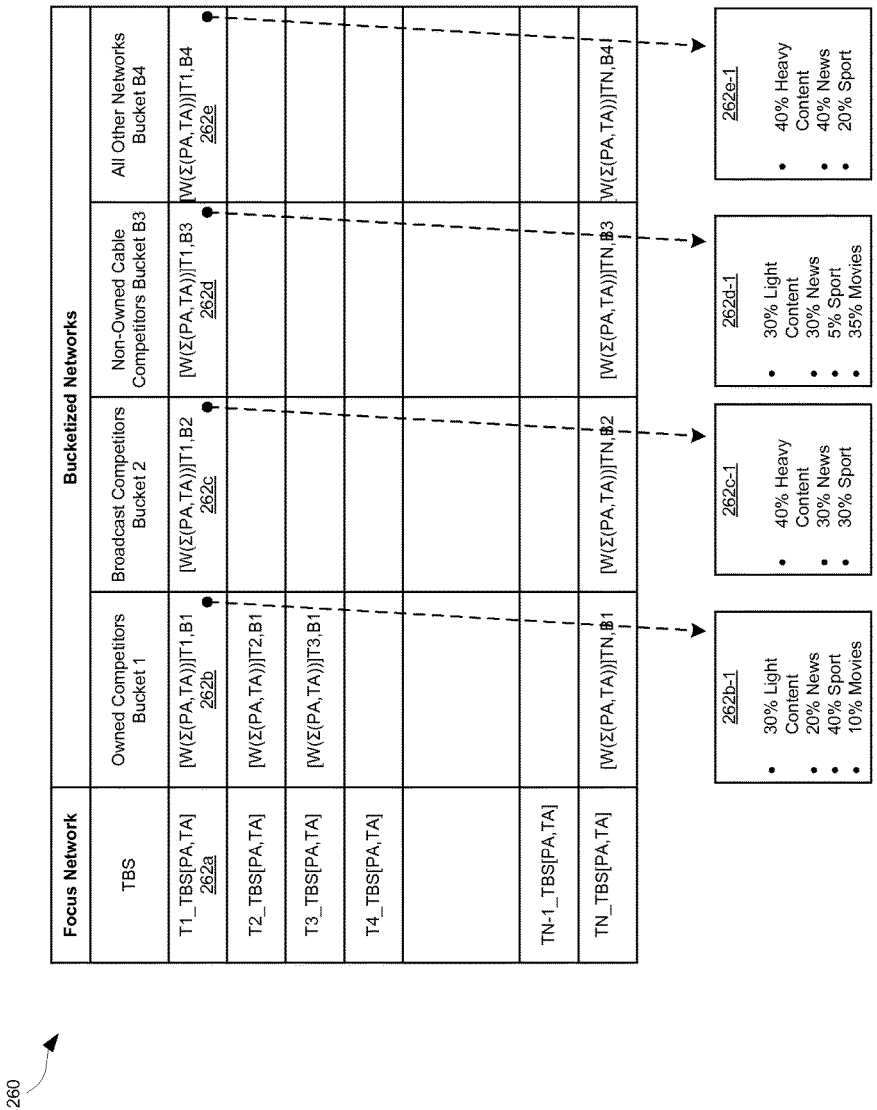
FIG. 2D is a diagram that illustrates a focus network determination for the framework for target audience rating estimation based on the target matrix of FIG. 2C, in accordance with various exemplary embodiments of the disclosure.

FIG. 2D is a diagram that illustrates a focus determination for the framework for target audience rating estimation based on the target matrix of FIG. 2C, in accordance with various exemplary embodiments of the disclosure. Referring to FIG. 2D, there is shown an exemplary focus matrix 260 including a focus network, TBS, and the bucketized networks in buckets, B1, B2, B3, and B4. The focus matrix 230 represents information for the 0-30 minute period of the base matrix 200 illustrated in FIG. 2C. A similar matrix may be generated for each remaining time periods for TBS, which are illustrated in FIG. 2D.

Consider the first target T1 in the 0-30 minute period (FIG. 2C), for TBS, with the program attributes PA, and time attributes TA, collective referenced as T1_TBS[PA,TA], 262a. The values for T1_TBS[PA,TA] are acquired from the demo matrix element 240a, in FIG. 2C. For the first target T1, a vector of the sum ($\Sigma(PA,TA)$) of program attributes and the time attributes for the each of the owned competitor networks, which are in bucket 1 is determined. The vector of the sum ($\Sigma(PA,TA)$) is determined by adding the individual contribution for each owned competitor network in bucket B1, which is found in the row for 0-30 minute (first 30-minute) period of the base matrix 235 illustrated in FIG. 2C for a period of, for example, 1 year. Since different shows may be presented in the 0-30 minute period, the vector of the sum ($\Sigma(PA,TA)$) for bucket B1 is weighted. The resulting weighted vector for the summed attributes of content for the networks in bucket B1, may be represented as [W($\Sigma$(PA,TA))]T1,B1]. An example weighted vector for the summed attributes of content for the networks in bucket B1 may comprise 30% light content, 20% news, 40% sport, and 10% movies, and is represented by reference number 262b-1.

Bucket B2 is handled in a similar manner as bucket B1. In this regard, the vector of the sum ($\Sigma(PA,TA)$) is determined by adding the individual contribution for each owned competitor network in bucket B2, which is found in the row for 0-30 minute (first 30-minute) period of the base matrix 235 illustrated in FIG. 2C, for a period of, for example, 1 year. Since different shows may be presented in the 0-30 minute period, the vector of the sum ($\Sigma(PA,TA)$) for bucket B2 is weighted. The resulting weighted vector for the summed attributes of content for the networks in bucket B1, may be represented as [W($\Sigma$(PA,TA))]T1,B2]. An example weighted vector for the summed attributes of content for the networks in bucket B2 may comprise 40% heavy content, 30% news, and 30% sport, and is represented by reference number 262c-1.

Bucket B3 is handled in a similar manner as buckets B1 and B2. In this regard, the vector of the sum ($\Sigma(PA,TA)$) is determined by adding the individual contribution for each owned competitor network in bucket B3, which is found in the row for 0-30 minute (first 30-minute) period of the base matrix 235 illustrated in FIG. 2C, for a period of, for example, 1 year. Since different shows may be presented in the 0-30 minute period, the vector of the sum ($\Sigma(PA,TA)$) for bucket B3 is weighted. The resulting weighted vector for the summed attributes of content for the networks in bucket B3, may be represented as [W($\Sigma$(PA,TA))]T1,B3]. An example weighted vector for the summed attributes of content for the networks in bucket B2 may comprise 30% light content, 30% news, 5% sport, and 35% movies, and is represented by reference number 262d-1.

Bucket B4 is handled in a similar manner as buckets B1, B2, and B3. In this regard, the vector of the sum ($\Sigma(PA,TA)$) is determined by adding the individual contribution for each owned competitor network in bucket B4, which is found in the row for 0-30 minute (first 30-minute) period of the base matrix 235 illustrated in FIG. 2C, for a period of, for example, 1 year. Since different shows may be presented in the 0-30 minute period, the vector of the sum ($\Sigma(PA,TA)$) for bucket B4 is weighted. The resulting weighted vector for the summed attributes of content for the networks in bucket B4, may be represented as [W($\Sigma$(PA,TA))]T1,B3]. An example weighted vector for the summed attributes of content for the networks in bucket B4 may comprise 40% light content, 40% news, and 20% sport, and is represented by reference number 262e-1.

Utilizing the variables, which correspond to targets instead of demos, as generated through the operations described above with respect to FIG. 2C and FIG. 2D, and equation 1 and equation 2, the most common approach is to estimate the parameters of this statistical model (the betas) utilizing maximum likelihood estimation techniques.

This may be repeated for all the targets in the 0-30 minute period, so that each target may have a corresponding β vector. Once all the targets for the 0-30 minute period are completed, the entire process may be repeated for the second 30-minute period (30-60), and so on until all corresponding values of β for all targets in the 48$^{th}$ 30-minute period are completed.

A composite matrix comprising demos and targets may be generated, based on, for example, FIG. 2B, and FIG. 2D.

The framework for audience rating estimation may be utilized to generate, for example, an estimate of the percentage audience that may be engaged in a certain activity. For example, the framework for audience rating estimation may generate a percentage average audience and/or a percentage total audience. In another aspect of the disclosure, the framework for audience rating estimation may generate an estimate of the actual number of persons that may be engaged in a certain activity. In this regard, the framework for audience rating estimation may generate an actual average audience or an actual total audience that may be engaged in a certain activity based on a generated forecast of the average total audience and a forecast of the total audience.

The framework for audience rating estimation may take into account the nesting effect within a program. The nesting effect refers to the various factors that may affect the program. Each program may have a specific effect, and this effect may be referred to as the baseline effect. Each program has a fixed audience that is expected. Based on the factors that may affect the program, the framework for audience rating estimation may add or subtract from the fixed audience. For example, every 30-minute period may have an effect on the program, and seasonality or special events may have an effect on the program.

Figure 3:
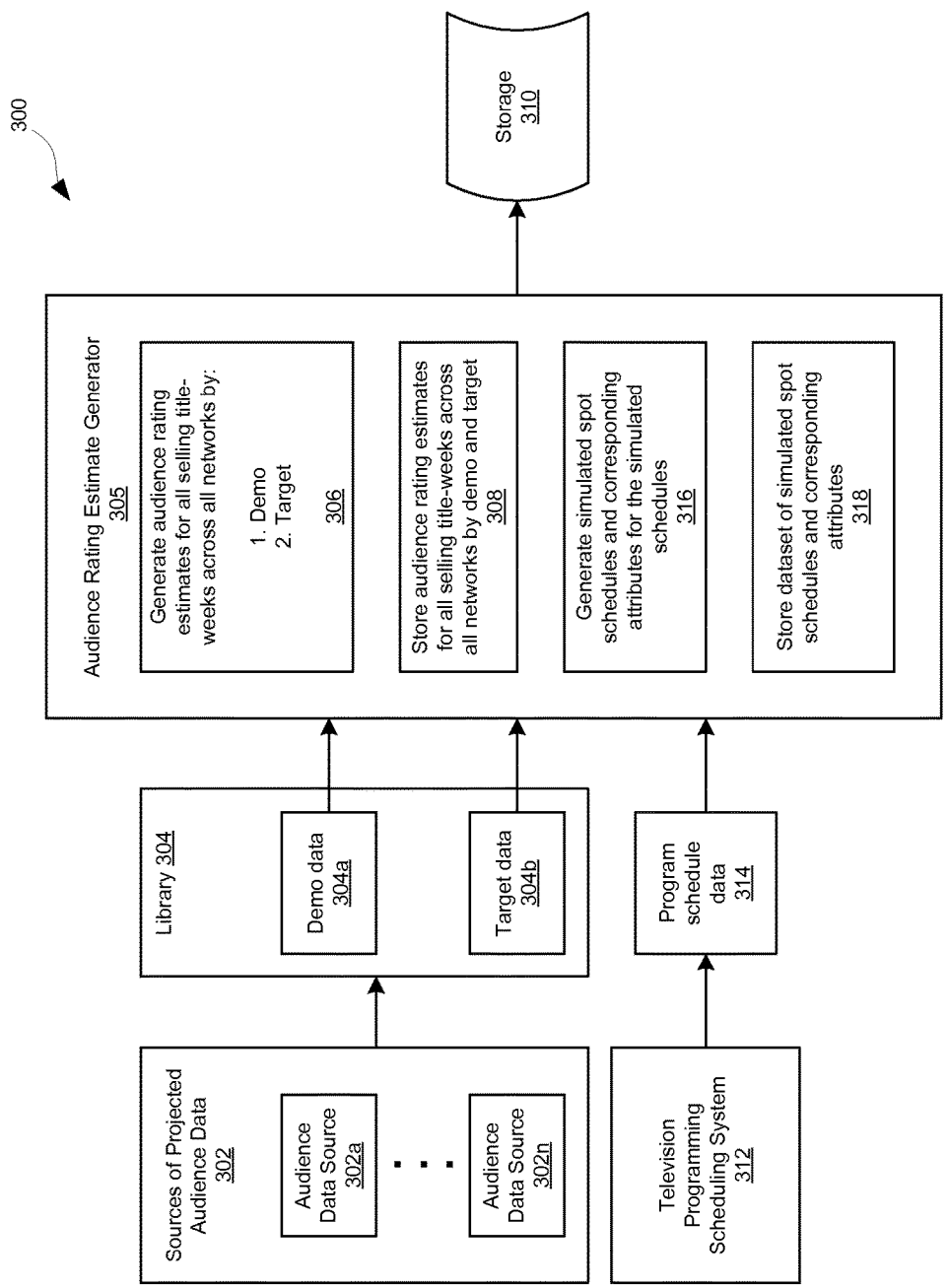
FIG. 3 is a high-level diagram illustrating exemplary generation of audience rating estimates and a dataset of simulated spot schedules and corresponding attributes based on demographics and targets across one or more networks, in accordance with various exemplary embodiments of the disclosure.

FIG. 3 is a high-level diagram illustrating exemplary generation of audience rating estimates and a dataset of simulated spot schedules and corresponding attributes based on demographics and targets across one or more networks, in accordance with an exemplary embodiment of the disclosure. Referring to FIG. 3, there are shown sources of projected audience data 302, library 304, audience rating estimation generator 305, storage 310, television programming scheduling system 312, and program schedule data 314.

The sources of projected audience data 302 may comprise a plurality of audience data sources 302a, . . . , 302n. Each of the plurality of audience data sources 302a, . . . , 302n are operable to generate projected audience data for one or more of the broadcast provider's networks. One or more of the audience data sources 302a, . . . , 302n may be operable to communicate projected audience data to the library 304. Nielsen may be an example of an audience data source.

The library 304 comprises a repository for storing data. In this regard, the library 304 may comprise demographics (demo) data 304a, and target data 304b.

The audience rating estimate generator 305 may generate audience rating estimates for all selling title-weeks across one or more of the networks that are operated by the broadcast provider. In this regard, at 306, the audience rating estimates may be generated for all selling title-weeks across one or more of the networks utilizing the program schedule data 314 by (1) demographics based on the demographics data 304a, or (2) target based on the target data 304b. The program schedule data 314 may be received from the television programming scheduling system 312. At 308, the audience rating estimates for all selling title weeks across one or more networks by demographics, and by target, may be stored in the storage 310. The audience rating estimate generator 305 may also handle generation of data that may be utilized to determine reach. In this regard, at 316, the audience rating estimate generator 305 may generate simulated spot schedules and corresponding attributes for the simulated spot schedules. At 318, the audience rating estimate generator 305 may store a dataset of the simulated spot schedules and corresponding attributes. The dataset of the simulated spot schedules and corresponding attributes may be stored, for example, in the storage 310. The audience rating estimate generator 305 may be part of the audience proposal creator 142c.

The storage 310 may be, for example, any kind storage device such as a disc, solid state memory, or other storage system such as a network attached storage system (NAS) or cloud-based storage system. The audience rating estimates for all selling title-weeks across one or more networks by demographics and by target may be stored in a database within the storage 310. The dataset of the simulated spot schedules and corresponding attributes may also be stored in a database within the storage 310. It should be recognized by those skilled in the art that although the library 304 is illustrated differently from the storage 310, the library 304 may be integrated within the storage 310.

Figure 4A:
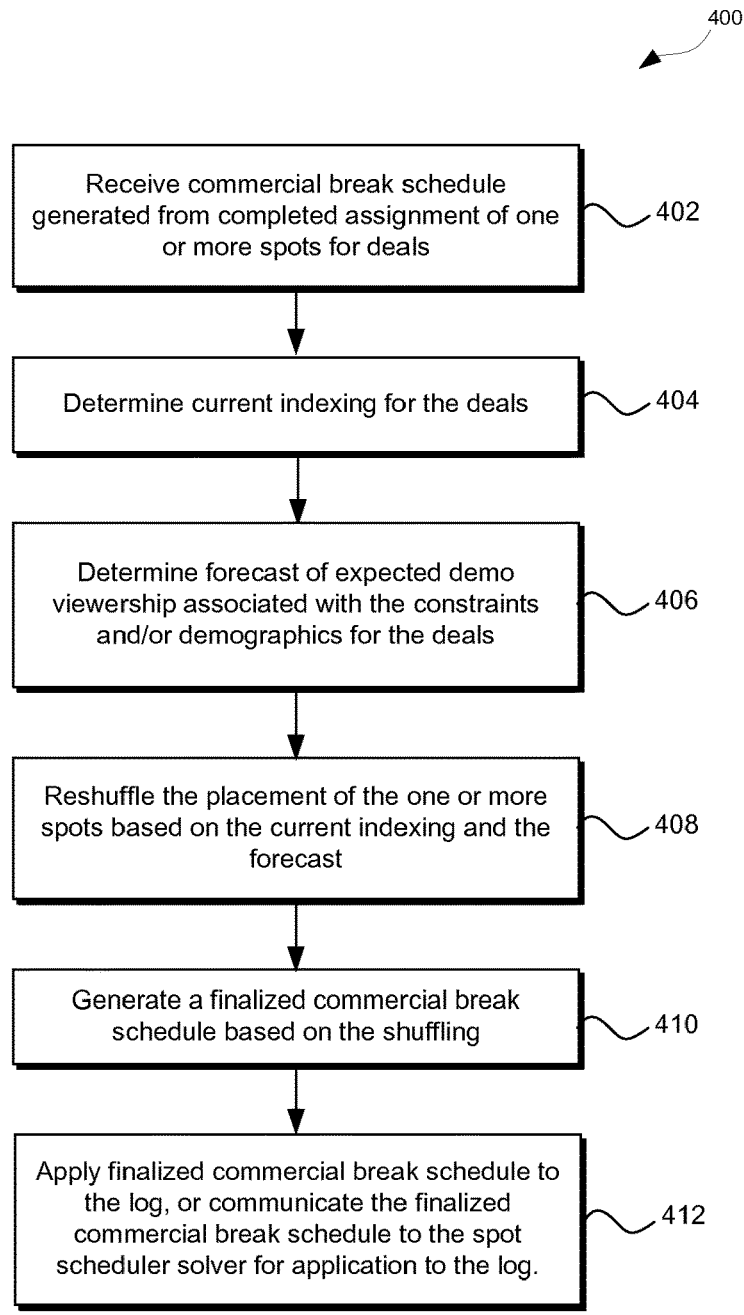
FIG. 4A is a flow chart illustrating exemplary operations for processing a commercial break schedule by an advertisement scheduler, in accordance with an exemplary embodiment of the disclosure.

FIG. 4A is a flow chart illustrating exemplary operations for processing a commercial break schedule by an advertisement scheduler, in accordance with an exemplary embodiment of the disclosure. Referring to FIG. 4A, there is shown a flow chart 400 that describes example operations 402 through 412 for processing by the advertisement scheduler 112.

At 402, the advertisement scheduler 112 may receive a commercial break schedule generated from a completed assignment of one or more spots for deals for processing. At 404, the advertisement scheduler 112 may determine a current indexing for the deals. The current indexing may represent the projected liability per pending spot and is determined based on what has already been aired, and what will be aired in the future. At 406, the advertisement scheduler 112 may determine a forecast of expected demo viewership associated with constraints and/or demographics for the deals is determined. In some embodiments of the disclosure, the advertisement scheduler 112 may determine a weighting value for adjusting the forecast. At 408, the advertisement scheduler 112 may reshuffle the placement of the one or more spots based on the indexing and the forecast. In instances where the weighting value for adjusting the forecast is determined, the advertisement scheduler 112 may be operable to reshuffle the placement of the one or more spots based on the indexing and the weighted forecast. The weighting factor may be generated based on historical analysis of demographics estimates, for every demographics, for every network including what is airing on the networks of competitors, at the 30-minute interval, and for an extended period, for example, one or more months, or one or more years. The weighting factor may take on a range of values, each of which may be updated. In instances where the estimates may be dependent on previous estimates, then a weighting factor may be utilized in combination with the previous estimate to weigh the error of the previous estimate and measurement. The weighting factor may be: (i) a constant: it may be a system parameter chosen based on data and model performance analysis, for example, prior to system roll out. This constant can be reassessed, if need, periodically e.g. yearly; (ii) time-varying: the weight changes at every time step depending on the estimates and observations variance; (iii) adaptive: the weight changes at every time step as a function of the estimates error variance. In this regard, the adaptive weight may be viewed as time varying as a function of error At 410, the advertisement scheduler 112 may generate a finalized schedule based on the shuffling. At 412, the advertisement scheduler 112 may apply the finalized commercial break schedule to the log/bin 152, or communicate the finalized commercial break schedule to the spot scheduler solver 110 for application to the log/bin 152. Additional details on advertisement scheduling are disclosed in U.S. application Ser. No. 14/842,799, which was filed on Sep. 1, 2015.

Figure 4B:
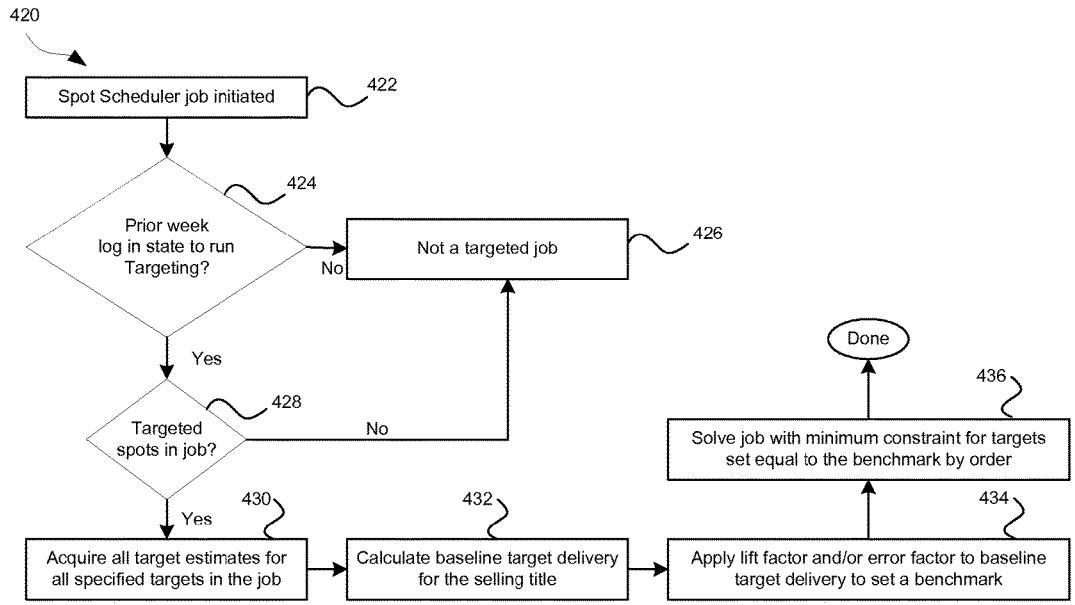
FIG. 4B is a flow chart illustrating exemplary operations for providing spot scheduling with targeting, in accordance with an exemplary embodiment of the disclosure.

FIG. 4B is a flow chart illustrating exemplary operations for providing spot scheduling with targeting, in accordance with an exemplary embodiment of the disclosure. Referring to FIG. 4B, there are shown a flow chart 420 comprising exemplary operations 422 through 436. The exemplary operations 420 through 436 may be performed by one or more components and/or functions of the television management system 100, for example, the targeting processor 113.

At 422, a spot scheduler job is initiated. At 424, it is determined whether the prior week log is in a state to run targeting. If at 424 it is determined that the prior week log is not in a state to run targeting, then at 426, it is not a targeted job.

If at 424 it is determined that the prior week log is in a state to run targeting, then at 428, it is determined whether there are targeted spots in the job. At 428, if it is determined that there are no targeted spots in the job, then 426, it is not a targeted job. If at 428 it is determined that there are targeted spots in the job, then at 430, all target estimates for all specified targets in the job are acquired. At 432, the baseline target delivery for the selling title is calculated. At 434, a lift factor and/or an error factor are applied to the baseline targeted delivery to set a benchmark. At 436, the job is solved with minimum constraints for targets set equal to a benchmark by order. Additional details on targeting are disclosed in U.S. application Ser. No. 14/842,808, which was filed on Sep. 1, 2015.

Figure 4C:
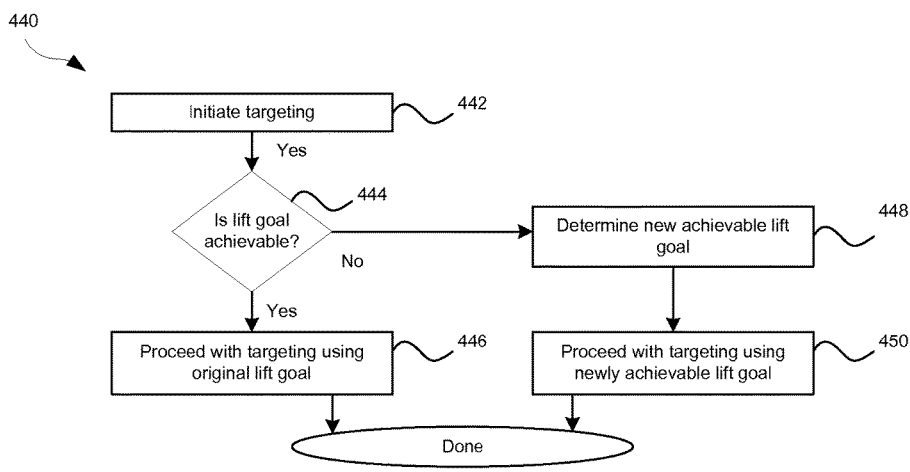
FIG. 4C is a flow chart illustrating modification of the lift goal, in accordance with an exemplary embodiment of the disclosure.

FIG. 4C is a flow chart illustrating modification of the lift goal, in accordance with an exemplary embodiment of the disclosure. Referring to FIG. 4C, there are shown a flow chart 440 comprising exemplary operations 442 through 450. The exemplary operations 442 through 450 may be executed by the targeting processor 113.

At 442, targeting is initiated. At 444, it is determined whether the lift goal is achievable. If at 444 it is determined that the lift goal is not achievable, then at 448, a new achievable lift goal is determined. At 450, proceed with targeting using the newly achievable lift goal. If at 444 it is determined that the lift goal is achievable, then at 446, proceed with targeting using the original lift goal. The exemplary operations may end (done) subsequent to operations 446 and 450.

Figure 4D:
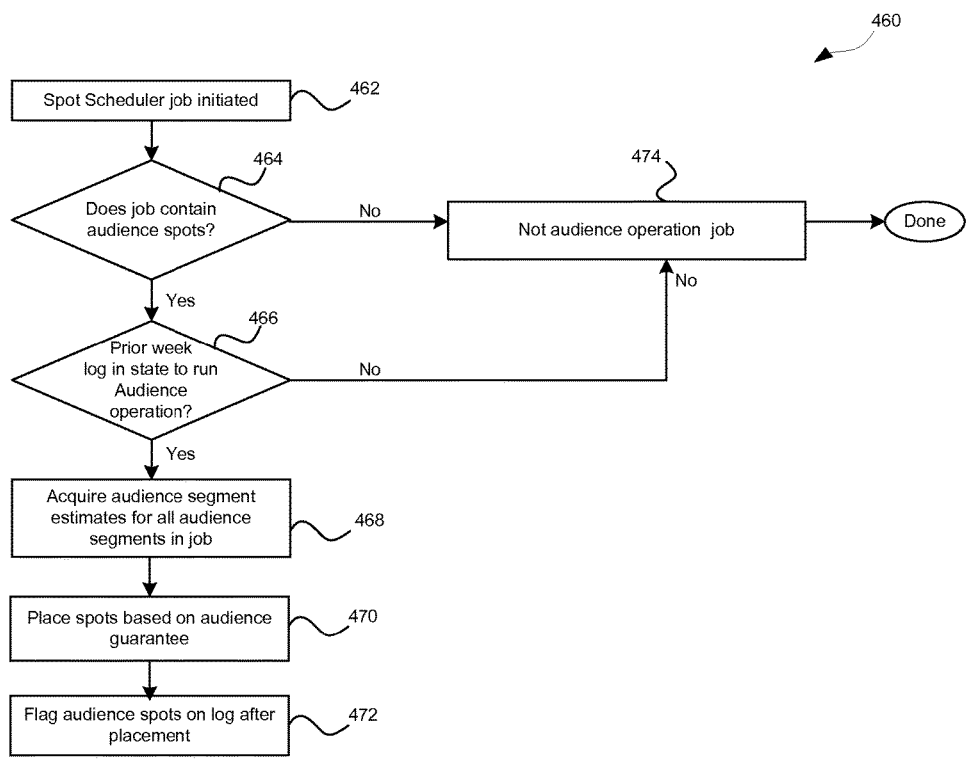
FIG. 4D is a high-level flow chart illustrating exemplary audience placement for advertiser spots that have an audience guarantee, in accordance with an exemplary embodiment of the disclosure.

FIG. 4D is a high-level flow chart illustrating exemplary audience placement for advertiser spots that have an audience guarantee, in accordance with an exemplary embodiment of the disclosure. Referring to FIG. 4D, there are shown exemplary operations 462 through 474. The exemplary operations 462 through 474 may be performed by one or more of the components and functions of the television management system 100.

At 462, the spot scheduler job is initiated. At 464, it is determined whether the job contains audience spots. At 464, if it is determined that the job contains audience spots, then at 466, it is determined whether the prior week log is in a state to run audience operation. At 466, if it is determined that the prior week log is in a state that allows running of the audience operation, then at 468, audience segment estimates for all audience segment in job are acquired. At 470, spots are placed based on audience guarantee. At 472, audience spots on the log are flagged or otherwise marked after placement. The flagging or marking of the audience spots on the log after placement serves as a notification that the spot was placed by the audience operation and cautions movement of the audience spot.

If at 466, it is determined that the prior week log is not in a state that allows running of the audience operation, then at 474, the job is not an audience operation job. If at 704, it is determined that job does not contain audience spots, then at 474, the job is not an audience operation job. The exemplary operations may end (done) after 474.

In accordance with various embodiments of the disclosure, only a portion of deals that are made may be designated as targeting deals, and not all the orders in a targeting deal have to be targeting orders. Accordingly, some deals may have no targeting orders, while other deals may have one or more targeting orders. Furthermore, it is desirable to identify inventory that can provide a certain lift when placing one or more targeting spots which could be provided certain percentage lift. The lift refers to a certain percentage over the baseline target delivery. For example, only the top 10% of the inventory for cereal buyers that could be provided a certain percentage lift may be targeted during the $39^{th}$ period. The placement for the spot may be modified so that the cereal advertisement is presented during the $39^{th}$ period when viewership of cereal buyers is at a maximum. One or more administration (admin) parameters may be utilized to set a default lift, and the default lift may be modified using the admin parameters.

In accordance with various embodiments of the disclosure, advertisement scheduling, targeting, and/or audience operation may be integrated. For advertisement scheduling, it is desirable to maximize delivery for candidate deals that are not pacing as expected in order to reduce the liability. For targeting, it is desirable to utilize the inventory that could provide a certain percentage lift when placing the targeting spots. Since there may be a high correlation between the placement of the targeting spots and the placement of the advertisement scheduling spots, the placement of the targeting spots should not consume all the available spots since this would not permit the placement of the advertisement scheduling spots to reduce the liability. In order to address this issue, a baseline target delivery may be determined for each target. The spots may then be placed to achieve a determined lift based on the baseline target delivery. For example, target A has a mean or median target delivery of 100. In order to provide a 25% lift, the baseline target delivery for target A would be 125 after placement. The determined lift is carefully determined in order to prevent over-delivery and unnecessary consumption of the airtime inventory, thereby limiting the number of inventory that may be available for advertisement scheduling. The delivery over the desired lift of spots cannot be reclaimed. For example, if the lift needed were only 10%, then providing a lift of 25% would result in a 15% additional delivery what is expected.

The average target delivery may be determined by summing all the delivery for a particular target in a 30-minute period within a bucket, and dividing by the number of deliveries of the target that occur within the 30-minute period within that bucket.

The median target delivery may be computed for each audience segment/order on each given network/selling title/week combination. The computation may be based on, for example, two main inputs, namely, (1) estimated audience segment delivery of all the half hours within that week that correspond to the parent selling title; and (2) the number of spots in the corresponding order that are scheduled in that parent selling title/week.

Let L represent list of half hours that correspond to the parent selling title/week Let n=size of L (number of half hours); and Let m represent number of spots in that parent selling title/week in the corresponding order.

The median schedule delivery may be computed as follows:
1. Let $L^S$ be L sorted in descending order of audience segment delivered. $L^S(i)$ refers to the i-th element of $L^S$, i=1, 2, ..., n.
2. Let $$r = m \bmod n$$

and $$c = \left\lfloor \frac{m}{n} \right\rfloor$$

a. If r and n have the same parity [i.e., either n is odd and r is odd or n is even and r is even]

$$\text{Median Schedule Delivery} = c\sum_{i=1}^{n} L^S(i) + \sum_{i=\left(\frac{r-m+2}{2}\right)}^{\left(\frac{r+m}{2}\right)} L^S(i)$$

b. Else [i.e., r and m have different parities].

$$\text{Median Schedule Delivery} = c\sum_{i=1}^{n} L^S(i) + \sum_{i=\left(\frac{r-m+1}{2}\right)}^{\left(\frac{r+m-1}{2}\right)} L^S(i)$$

The lift goal may also be dynamically modified or changed over time based on actual accruals. In this regard, if the actual target is lower than the forecasted target, the lift goal may be increased in order to increase the viewership. It should be recognized that other metrics may be utilized without departing from the spirit and scope of the various embodiments of the disclosure.

In accordance with various embodiments of the disclosure, targeting may or may not be a guaranteed service and for targeting impressions that are not delivered, extra spots may sometimes be provided as compensation. In one exemplary embodiment of the disclosure, the demo delivery may be guaranteed, but the expected lift may not be guaranteed. In another exemplary embodiment of the disclosure, the demo delivery may be guaranteed, and the expected lift may also be guaranteed. In another exemplary embodiment of the disclosure, the lift may be guaranteed, but the demo delivery may not be guaranteed.

Figure 5A:
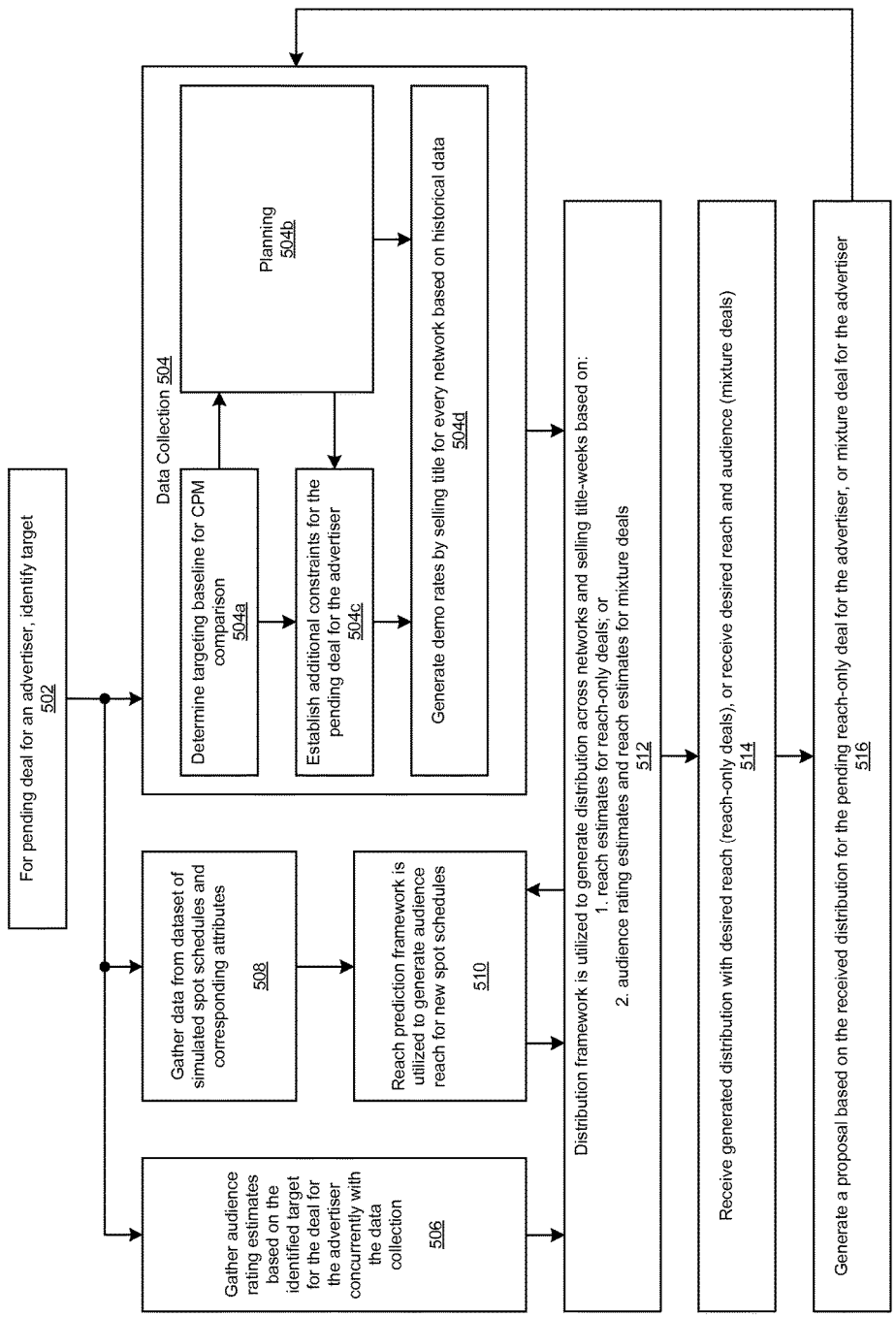
FIG. 5A is a high-level diagram illustrating exemplary proposal generation for a pending deal, in accordance with an exemplary embodiment of the disclosure.

FIG. 5A is a high-level diagram illustrating exemplary audience proposal generation for a pending deal, in accordance with an exemplary embodiment of the disclosure. Referring to FIG. 5A, there are shown operations 502 through 516. Operation 504 may be referred to as a data collection 504. The data collection 504 comprise operations 504a, . . . , 504d. The operations 502 through 516 may occur with the advertisement management system 100, which is illustrated in FIG. 1A.

At 502, for a pending deal for an advertiser, identify the target.

During data collection 504, at 504a, a target baseline is determined for cost per thousand (CPM) comparison. At planning 504b, various parameters for the deal for the advertiser may be established based, for example, on the determined target CPM goal. For example, demographics rates (demo rates) per selling title (ST) for the advertiser are established. The demo rates specify how much the advertiser should be charged per spot when buying a demo. In general, the rate that is charged for a spot which is sold by audience should be greater than or equal to the rate that is charge for selling the same spot by demo. A spot that is sold by audience may be referred to as an audience spot. At 504c, additional constraints for the pending deal for the advertiser may be established. The additional constraints may comprise constraints that may be imposed by the planning operation 504b. At 504d, demo rates by selling title for every network may be generated based on historical data for the advertiser for the pending deal in accordance with the general and/or additional constraints.

At 506, audience rating estimates are gathered based on the identified target for the deal for the advertiser. The gathering of the audience rating estimates at 506 occurs concurrently with the data collection 504. The audience rating estimates for the deal for the advertiser may be gathered from the library 304, and/or the storage 310, which are illustrated in FIG. 3.

At 508, data is gathered from the dataset of simulated spot schedules and corresponding attributes. At 510, a reach prediction framework is utilized to generate audience reach for new spot schedules. The gathering of the data from the dataset of simulated spot schedules and corresponding attributes 508, and the generation of the audience reach for new spot schedules 510 occurs concurrently with the gathering of the audience rating estimates at 506, and concurrently with the data collection 504. The data from the dataset may be gathered from the library 304, and/or the storage 310, which are illustrated in FIG. 3. The outputs from 506, 508, 510, and 504 are communicated to 512. Operations 508 and 510 are executed when reach data is required. For example, operations 508, and 510 may be executed for a reach deal (reach-only deal), and for a mixture deal, that latter of which has both an audience component and a reach component. In accordance with an aspect of the disclosure, there may be a dependency of the reach prediction framework on the generation of the audience rating estimates. Although the audience rating estimates may serve as an input to the reach prediction framework there may be some back and forth interaction or communication between the reach prediction framework, the distribution framework, and the framework for audience rating estimates in order to achieve the audience goals to generate the proper distribution for the allocation.

At 512, a distribution framework is utilized to generate a distribution across networks and selling title-weeks based on, for example, (1) reach estimates for reach-only deals, or (2) on audience rating estimates, and reach estimates for mixture deals. In accordance with an exemplary embodiment of the disclosure, the audience processor 153 may be operable to perform scheduling of audience spots based on a distribution of audience spots that is generated by the audience proposal creator 142c utilizing the distribution framework. The distribution framework may also utilize the available capacity (avails) per selling title to generate the distribution. The available capacity or avails is determined by subtracting the amount of inventory that has been sold from the total inventory (total capacity). The available capacity or avails is determined for each selling title-week. In other words, the avails represent the air time that is available to allocate the spots. At 512, in instances where a deal has a reach component, then a reach prediction framework is utilized to generate an audience reach for new spot schedules.

At 514, the generated distribution with desired reach (reach-only deals) is received, or the desired reach and audience (mixture deals) are received. This distribution generation is handled by the proposal system 142, and may be referred to as the audience proposal creation. At 514, in instances where a deal has a reach component, then generated audience reach for the new schedules are received. At 514, for mixture deals, the desired reach and audience are received.

At 516, a proposal is generated based on the received distribution for the pending reach-only deal for the advertiser, or mixture deal for the advertiser. For example, for a mixture deal which has an audience component and a reach component, then the proposal is generated based on the received distribution for the pending deal for the advertiser and the generated audience reach.

In accordance with one embodiment of the disclosure, the identification of the target 502, and the data collection 504 may be handled by the proposal system 142. The generation of the audience rating estimates, and the generation of the simulated spot schedules may be handled by the audience rating estimate generator 305, and the audience proposal creator 142c may gather or acquire the audience rating estimates from the storage 310 and/or the library 304. The generation of the distribution by the distribution framework at 512 may be handled by the audience proposal creator 142c.

It should readily be understood that although a proposal is generated at 516, this proposal may be an interim proposal and not a final proposal. In this regard, the proposal generated at 516 may be communicated to the planning 504b of the data collection 504 for review and acceptance. If the planning 504b and the advertiser accepts the proposal, the proposal becomes a finalized proposal. If the planning 504b and/or the advertiser rejects the proposal, the additional constraints may be added at 504c, and one or more of the operations 504d, 508, 510, 512, 514, and 516 may be repeated until the planning 504b and the advertiser accepts the generated proposal. In this regard, one or more iterations of the operations 504d, 508, 510, 512, 514, and 516 may occur to generate a finalized proposal.

In accordance with one embodiment of the disclosure, there may or may not be a guarantee on the demo portion of the deal. However, there may be a guarantee on the audience portion of the deal. Similarly, there may be a guarantee on the reach portion or component of a deal.

Figure 5B:
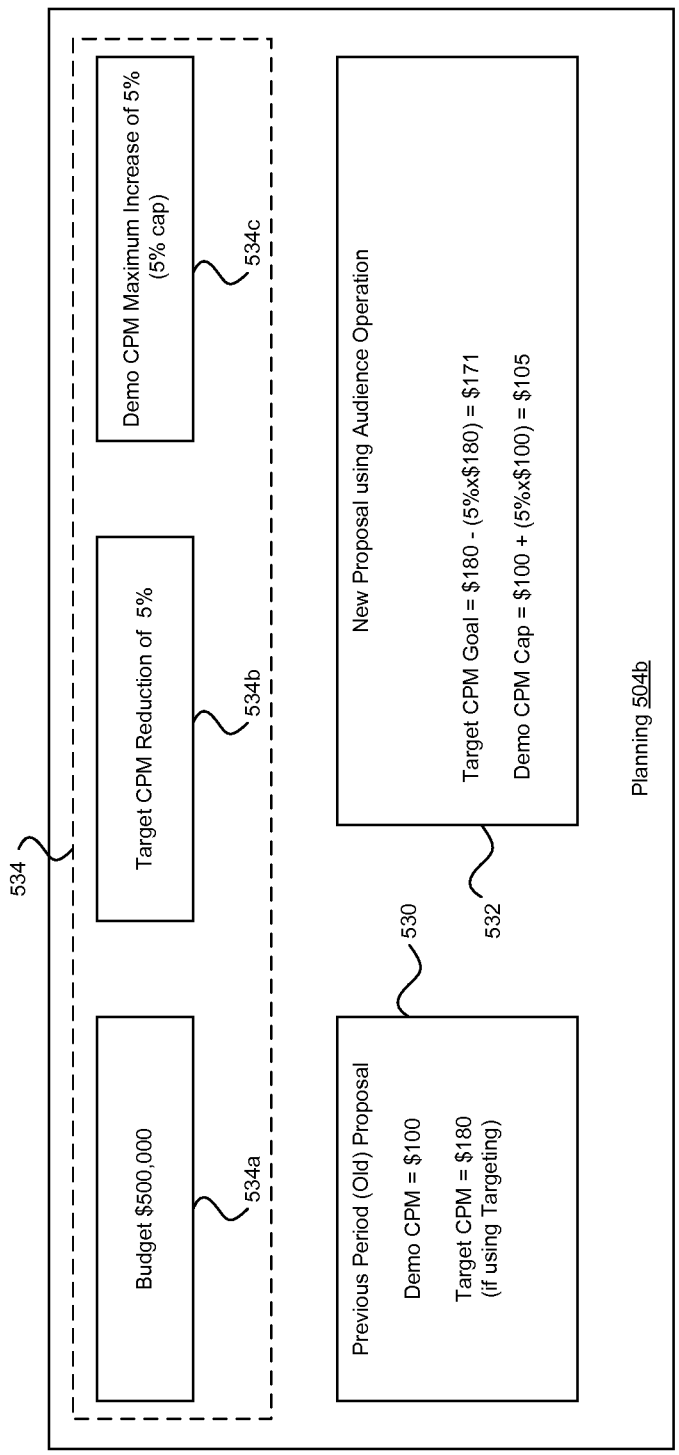
FIG. 5B is a diagram that illustrates example audience planning for a pending deal for an advertiser, in accordance with an exemplary embodiment of the disclosure.

FIG. 5B is a diagram that illustrates example audience planning for a pending deal for an advertiser, in accordance with an exemplary embodiment of the disclosure. Referring to FIG. 5B, there is shown planning operation 504b. Planning operation 504b may include parameters 534 for the deal for the advertiser, a previous period (old) proposal 530, and a new proposal 532 using audience operation. It should be noted that the operations in FIG. 5B are not applicable to a reach component of a deal.

The parameters 534 for the deal for the advertiser comprise budget parameters 534a, target CPM reduction parameter 534b, and demo CPM parameter 534c. The parameters 534 are negotiated between the advertiser and the broadcast provider. The parameters 534 may be referred to as general constraints. Optional constraints may comprise, for example, maximum units per selling title-week, a limit on the total number of units in the deal, maximum impression and/or unit percentages (%) by network or selling title, and limits on rate increases and whether or not to increase the rates in the same proportion. The maximum units per selling title-week represents the maximum number or units that may be allocated to a selling title-week. The number of units limit represents a limit or cap on the total number of units for the particular budget. The impression and/or unit percentages (%) by network or selling title represents the maximum percentage of impressions and/or units per network or selling title that can be allocated. The optional parameters may also be negotiated between the advertiser and the broadcast provider and/or may be imposed as part of the planning operation 504b. For example, the general and/or optional parameters may be imposed during the one or more iterations that may occur in order to generate a finalized proposal. For example, the proposal system 142 may be operable to impose the general and/or optional constraints.

The budget parameters 534a represent the total amount that the advertiser wants or desires to spend on the deal, and which is to be distributed across all the units. The target CPM reduction parameter 534b represents the percentage by which the planning operation 504b will reduce the CPM for the target. The demo CPM parameter 534c represents a cap or maximum percentage by which the planning operation 504b will increase the demo CPM.

The previous period proposal 530 represents the previous deal that was made by the advertiser. As illustrated, for the previous period proposal 530 included a demo CPM of $100, and a target CPM of $180. It should be recognized by one skilled in the art that the invention is not limited to the use of the single previous period proposal 530. Accordingly, a plurality of other previous period proposals or other information may be utilized. For example, the previous year proposal 530 could be used along with audience rating estimates for the current year to determine the demo CPM and/or target CPM.

A goal of the new proposal 532 is to reduce the target CPM that was or would have been paid in the previous period proposal 530. Accordingly, in the new proposal 532, a target CPM is calculated based on the target CPM reduction parameter 534b of 5%. Accordingly, in the new proposal 532, the target CPM is $171, and this is designated as the goal for the target CPM. Additionally, in the new proposal 532, a new demo CPM cap of $105 is calculated based on the demo CPM parameter 534c of 5%. Under the new proposal 532, the target CPM will be decreased by 5% to $171 without causing an increase of more than 5% in the demo CPM. In other words, the demo CPM is going to be capped at $105.

FIG. 6 is a diagram that illustrates an exemplary allocation of simulated spots based on selling title, maximum allocation to selling title, and maximum total units, in accordance with an exemplary embodiment of the disclosure. Referring to FIG. 6, there is shown a grid 600, comprising selling title and possible allocation of units. In order to simplify the illustration, the weeks for the selling title weeks are not shown, and allocation occurs in bins of 2 units. For this example, the flight is Oct. 1, 2015 (10/01/2015) through Oct. 15, 2015 (10/15/2015), the maximum (max) unit allocation to selling title (ST) is 6, the allocation bins is 2, and the maximum (max.) schedule total units is 10.

The grid 602 comprises the unit allocations schedule 602, and a percentage (%) allocation schedule 604. The unit allocation schedule 602 shows the possible allocation of units 606 across selling titles ST1, ST2, and ST3. The total units allocated is derived by summing the unit allocations across the selling titles ST1, ST2, and ST3. For example, for the first allocation in which ST1 has 2 units, ST2 has 0 units, and ST3 has 0 units, the total units is 2 (2+0+0). For the second allocation in which ST1 has 0 units, ST2 has 2 units, and ST3 has 0 units, the total units is 2 (0+2+0). For the tenth allocation in which ST1 has 6 units, ST2 has 0 units, and ST3 has 0 units, the total units is 6 (6+0+0). For the eleventh allocation in which ST1 has 4 units, ST2 has 2 units, and ST3 has 0 units, the total units is 6 (4+2+0).

The percentage allocation schedule 604 for a particular selling title is derived by dividing the total number of units for the particular allocation by the units allocated for the selling title for the particular allocation. For example, for the first allocation, the percentage allocation schedule for ST1 is 2/2 or 100%, the percentage allocation schedule for ST2 is 0/2 or 0%, the percentage allocation schedule for ST3 is 0/2 or 0%. For the second allocation, the percentage allocation schedule for ST1 is 0/2 or 0%, the percentage allocation schedule for ST2 is 2/2 or 100%, the percentage allocation schedule for ST3 is 0/2 or 0%. For the tenth allocation, the percentage allocation schedule for ST1 is 6/6 or 100%, the percentage allocation schedule for ST2 is 0/6 or 0%, the percentage allocation schedule for ST3 is 0/6 or 0%. For the eleventh allocation, the percentage allocation schedule for ST1 is 4/6 or 67%, the percentage allocation schedule for ST2 is 2/6 or 33%, the percentage allocation schedule for ST3 is 0/6 or 0%.

The distribution of total units that is desired may be input to the reach prediction framework as illustrated in the percentage allocation schedule 604, and the reach prediction framework may translate the desired distribution to the unit level allocation. In this regard, the modeling is being done on the number of units. The percentage allocation schedule 604 may be an input to the audience proposal creator 142c.

The goal of the audience reach estimation is to generate estimates of unduplicated audience given a desired unit distribution framework. In order to estimate reach, large-scale sampling of simulated or hypothetical spot schedules from historical data may be employed based on important advertiser decision points or inputs. Exemplary decision points or inputs may include, but are not limited to: (1) advertising campaign/schedule flight (length of time, and time of year), (2) schedule target or demographic gross audience rating, and schedule target network(s), and general placement (time of day, selling title).

In order to simplify the sampling process, it is assumed that commercial minute-level audience ratings are somewhat homogenous within half-hour bins of time. Accordingly, commercial minutes are assigned to half-hour bins. The set of possible half-hour assignments to place an advertising unit for any of a plurality of broadcast provider networks j in a chosen quarter (Qtr) may be expressed as the following set:

$$H_j = \{h : h \text{ is a half-hour with commercial time on Network } j\}$$

Hence, the half-hour assignment capacity of all of the broadcast provider's networks (BPN) in any given time period may be denoted as the union of network half hour assignments possibilities:

$$C_{BPN} = \bigcup_{j=1}^{k} H_j$$

Let A equal all possible subsets of half-hours to which an advertising unit may be assigned, defined by the power set of the capacity of the plurality of broadcast provider's networks (BPN):

$$A = \mathcal{P}(C_{BPN}) = \{X : X \subseteq C_{BPN} \text{ and } X \text{ is not empty}\}$$

A set of possible half hour assignments may be created for advertising units with $n \in \mathbb{N} : n > 0$, units, assigned to n distinct half hour bins in the following way:

$$a_n = \{X : X \subseteq C_{BPN}, |X| = n, \text{ and } X \text{ is not empty}\}$$

Since the cardinality of any of these sets of spot schedules is massive, (e.g. set A has cardinality $2^{|C_{BPN}|} - 1$), in order to simplify the estimation problem, constraints may be imposed or enforced on the sampling. For example, one constraint may allow that one unit from any spot schedule will air in a half-hour on any given network. Notwithstanding, units are allowed to air concurrently on distinct networks. Another constraint that may be imposed or enforced to further limit possible unit assignments, includes constraining the selection of half hours for unit placement to some user-defined subset of time, or selling category on networks of interest.

In an illustrative embodiment of the disclosure, a random sampling of simulated spot schedule 1 for ST1 and WK1 combination for a particular Quarter will yield or give x1 discrete half-hour assignments, and a random spot S1 may be selected within a half-hour assignment. Based on this sampling for simulated spot schedule 1, a length of the simulated spot schedule 1, which is referred to as the flight for simulated spot schedule 1 may be determined. In an exemplary embodiment of the disclosure, the flight for simulated spot schedule 1 may be determined by computing a difference between a start spot and an end spot of the simulated spot schedule 1. For simulated spot schedule 1, the number of spots and the allocations are already known. The sum of the total impressions for simulated spot schedule 1 is equivalent to the gross audience within each random sample of simulated spot schedule 1. Similarly, a random sampling of simulated spot schedule 2 for ST1 and WK2 combination for a particular Quarter will yield or give x2 discrete half-hour assignments, and a random spot S2 may be selected within a half-hour assignment. Based on this sampling for simulated spot schedule 2, a flight for simulated spot schedule 2 may be determined. In an exemplary embodiment of the disclosure, the flight for simulated spot schedule 2 may be determined by computing a difference between a start spot and an end spot of the simulated spot schedule 2. For simulated spot schedule 2, the number of spots and the allocations for the selling title and weeks combinations are already known. The sum of the total impressions for simulated schedule 2 is equivalent to the gross audience within each random sample of simulated spot schedule 2. A spot separation parameter may be utilized to, for example, increase predictive accuracy, and provide the capability to estimate an impact (+/−) of evenly distributed unit allocation on a schedule's unduplicated audience. For example, instead of having 1 spot in ST/W1 and 12 spots in ST/WK13, the spots may be more evenly distributed across the ST/WK for the Qtr. The spot separation may be determined by computing, for example, an average time distance between spots.

In order to provide a robust dataset, the sampling of the simulated spot schedules includes a wide range of spot counts, flight ranges, and allocations. Based on the generated dataset, a planner may select a flight (e.g. 3 weeks), percentage allocations across a specified set of selling titles in order to provide a specified reach. In accordance with various embodiments of the disclosure, reach may be determined for a single network or for a plurality of networks.

An exemplary sampling operation that may be utilized to build a dataset of simulated spot schedules may be as follows:

Input Parameters:
w=schedule flight length, where w is in an integer>0 expressing the number of weeks an ad schedule will be in flight
u=unit count, where $$u \in \{5, 10, 15, 25, \ldots, ; u \leq \text{some upper bound of proposed schedule unit counts}\}$$

d=unit distribution across networks and selling category or title
t=schedule target quarter or year It should be noted that the bins for the unit count, u, may utilize other increments, for example, two (2), or three (3), without departing from the spirit and scope of the various embodiments of the disclosure.

Output:

For k=1 to K (the desired number of schedules to sample):
    Randomly sample a flight start date of length w based on start dates with an end date less than or equal to the end of period t
    Randomly sample, without replacement, possible half hour assignments for unit selection subject to constraints d
    Randomly sample a possible commercial minutes, within each sampled half hour assignment
        Compute schedule statistics and extract advertisement (Ad) schedule characteristics from each sampled schedule, e.g.:
            Unduplicated viewers and panel weights (depending on data source)
            Ad schedule gross rating points for target or demographic audience
            Ad schedule unit count
            Ad schedule length (in days)
            Ad schedule spot separation
            Day of week distribution
            Time of day distribution
            Network and selling title distribution
    Append ad schedule summary and characteristics to list of sample schedules which comprise the simulated or hypothetical spot schedules dataset which is stored in the library.

Predictions of audience reach for new spot schedules may be generated via a prediction model utilizing the dataset of sampled spot schedule data.

An exact formulation of the prediction model may vary depending on, for example, whether the desired outcome for prediction is unduplicated reach percentage (or probability of exposure), or actual reached audience (persons (000)). The prediction model may take on the form of a generalized linear model:

$$E[R]=g^{-1}(X\beta)$$

Where:
R is the desired outcome describing reach.
g stands for a link function to the desired probability distribution.
X is a model matrix composed of variables extracted from the sampled data.
$\beta$ is a vector of parameters to be estimated.

Since sampled spot schedules only take on unit counts u, schedules where the desired unit count is not u∉{5, 10, 15, 25, . . . }, which may include schedules such as {4, 6, 7, . . . }, may be estimated through a linear approximation through the model specified above.

Figure 7:
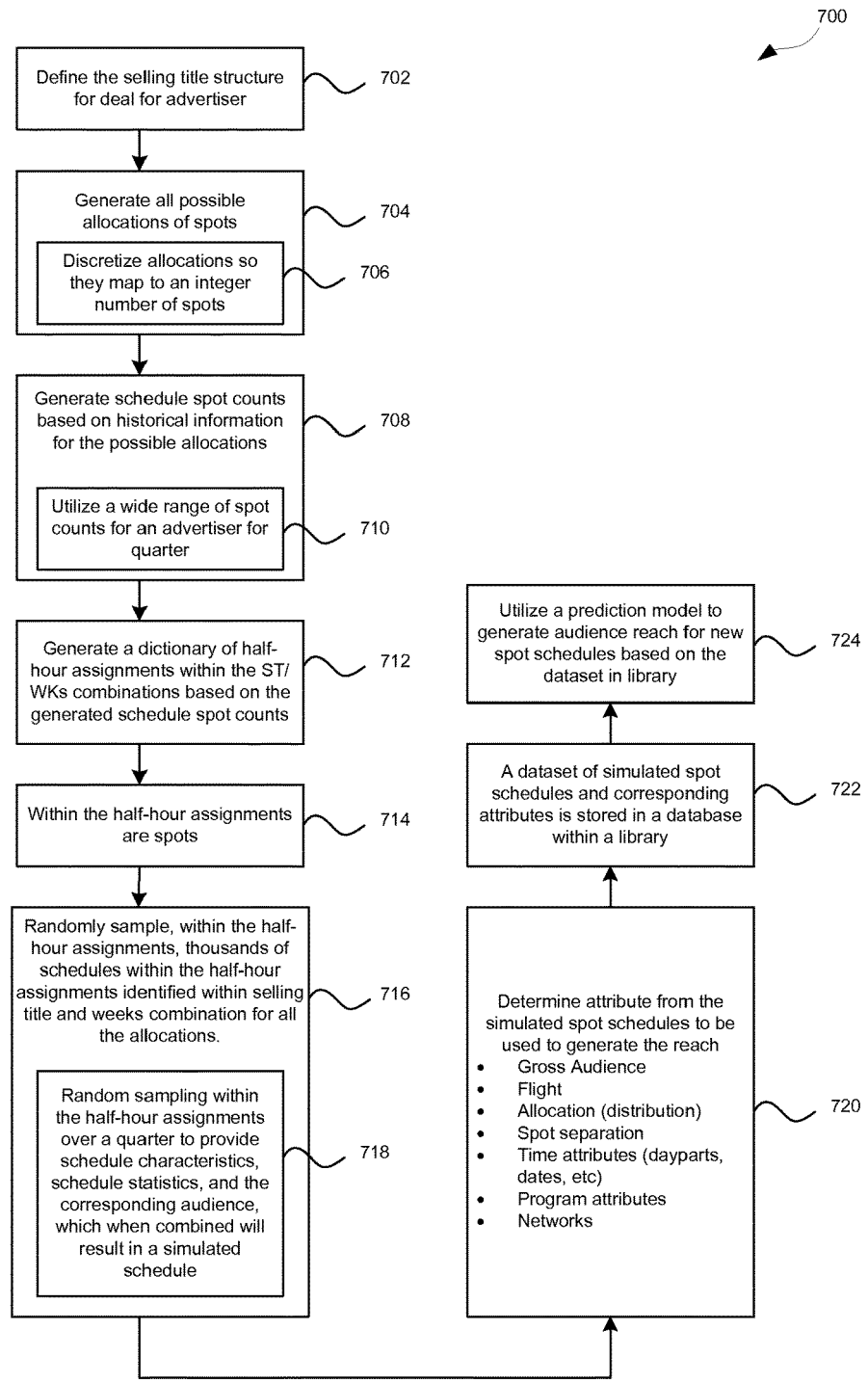
FIG. 7 is a diagram illustrating exemplary operations for a framework for simulated spot schedule generation and sampling, and audience reach estimation, in accordance with an exemplary embodiment of the disclosure.

FIG. 7 is a diagram illustrating exemplary operations for a framework for simulated spot schedule generation and sampling, and audience reach estimation, in accordance with an exemplary embodiment of the disclosure. Referring to FIG. 7, there is shown an operation flow 700 comprising exemplary operations 702 through 724. The exemplary steps 702 through 724 may be executed by the audience proposal creator 142c.

At 702, define the selling title structure for deal for advertiser. At 704, generate all possible allocations of spots. The generation of the possible allocations of spots may include, at 706, discretize allocations so that the allocations map to an integer number of spots. At 708, generate schedule spot counts based on historical information for the possible allocations. The generation of the schedule spot counts may include, at 710, a wide range of spot counts from the advertiser for the quarter are utilized. At 712, generate a dictionary of half-hour (30 mins) assignments within the selling title and weeks combinations based on the generated schedule spot counts. At 714, within the half-hour assignments are spots.

At 716, randomly sample, within the half-hour (½) hour assignments, thousands of schedules within the half-hour assignments identified within the selling title and weeks combinations for all the allocations. The random sampling may include, at 718, random sampling within the half-hour assignments over a quarter (Qtr) to provide schedule characteristics, simulated statistics, and the corresponding audience, which when combined, will result in a simulated schedule.

At 720, determine attributes from the simulated spot schedules to be utilized to generate the reach. Exemplary attributes may comprise: gross audience, flight, allocation (distribution), spot separation, time attributes (dayparts, dates, etc), program attributes, and networks. At 722, a dataset of the simulated spot schedules and the corresponding attributes may be stored in a database within a library. At 724, a prediction model may be utilized to generate audience reach for new spot schedules based on the dataset in library.

Figure 8:
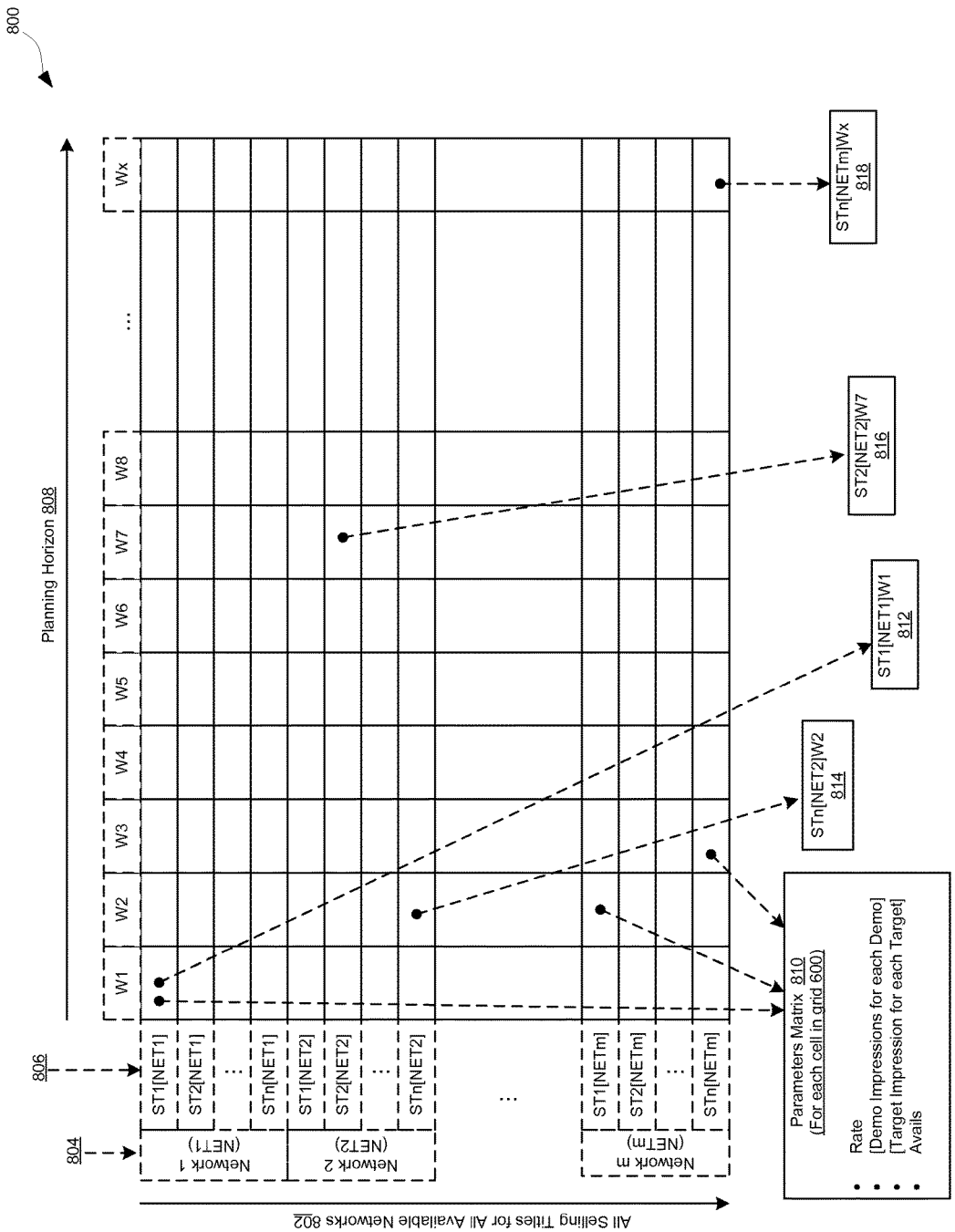
FIG. 8 is a diagram that illustrates a distribution framework that may be utilized to generate unit (spot) distribution across networks and selling title-weeks combinations, in accordance with an exemplary embodiment of the disclosure.

FIG. 8 is a diagram that illustrates a distribution framework that may be utilized to generate distribution across networks and selling title and weeks combination, in accordance with an exemplary embodiment of the disclosure. Referring to FIG. 8, there is shown a grid 800 that may be utilized for generating a distribution across networks and selling title-weeks combinations. The grid 800 illustrates a mapping of all selling titles for all available networks 802 to a planning horizon 808, which is represented in weeks.

The networks 804 are referenced as NET1, . . . , NETm, where m is an integer that is greater than or equal to 1. The selling titles (ST) 806 are referenced as ST1, . . . , STn, where n is an integer that is greater than or equal to 1. All the selling titles for network 1 (NET1) are referenced as ST1[NET1], . . . , STn[NET1]. All the selling titles for network 2 (NET2) are referenced as ST1 [NET2], . . . , STn[NET2]. All the selling titles for network m (NETm) are referenced as ST1 [NETm], . . . , STn[NETm].

The planning horizon 808 represents the weeks for the duration of the deal, and may be 1 quarter (Qtr) or 13 weeks, 2 Qtrs or 26 weeks, 3 Qtrs or 39 weeks, 4 Qtrs or 52 weeks, and so on. The weeks are referenced as W1, W2, . . . , Wx, where x is an integer greater than or equal to 1.

For network 1, selling title 1, week 1, may be represented as ST1[NET1]W1, 812. For network 2, selling title n, week 2, may be represented as STn[NET2]W2, 814. For network 2, selling title 2, week 7, may be represented as ST2[NET2]W7, 816. For network m, selling title n, week x, may be represented as STn[NETm]Wx, 818.

For each network, and for each selling title-week combination, there is a corresponding rate parameter, demographics (demo) impressions or audience for each demo parameter, and target impressions or audience for each target parameter, which are referenced as parameters 810. The parameters 810 may be represented as a vector. Accordingly, parameters 810 may be referred to as parameter matrix or a parameter vector. The rate parameter may be constant across all the weeks or may vary across one or more weeks. For example, the rate parameter may vary based on quarter or other criteria such as, for example, demand. The demo impressions for each demo parameter is a vector that represents an estimate of the average demo impressions for each demo for each selling title and week combination. The target impressions for each target parameter is a vector that represents an estimate of the average target impressions or audience for each target for each selling title and week combination. The avails parameter represents the air time that is available to allocate the spots.

Other inputs to the distribution framework include the parameters 534 for the deal, namely, the advertiser budget parameters 534a, target CPM reduction parameter 534b, and demographics CPM maximum percentage increase parameter 534c, which may be referred to as general constraints. Optional constraints that may be input to the distribution framework may comprise, for example, maximum units per selling title-week, a limit on the total number of units, impression and/or unit percentages (%) by network or selling title, and limits on rate increases and whether or not to increase them in the same proportion. Some of the inputs to the distribution framework may be hard constraints that have to be satisfied. For example, the budget parameters 534, target CPM reduction parameter 534b, demo CPM maximum percentage increase parameter 534c, avails parameter, maximum units per selling title-week, number of units limit, and limits on rate increases may be hard constraints. Due to differences in availability of units throughout the quarter, it may be necessary to skew the distribution for a specified period of time, for example, a number of weeks. Accordingly, some embodiments of the disclosure may comprise a skewing factor that may be utilized to skew the distribution for a specified period of time. Additional inputs include the rates per selling title which will be used as the floor (minimum) prices to determine the value of the units allocated to the deal. This means that the rates could be increased as a part of the distribution framework, but they cannot be decreased. It should be understood by one skilled in the art that although a rate decrease may not be desirable, the distribution framework may accommodate a decrease in rate if needed.

The distribution framework utilizes the inputs to determine, for each deal, for each advertiser, a distribution or schedule of units for each selling title-week combination as well as the final rates to be charge for the units on a selling title. In this regard, the distribution framework is operable to determine how many units are to be assigned or allocated to each selling title and week combination for each deal. In other words, the distribution framework determines how many units are to be assigned or allocated across all the available selling titles, across one or more networks, and across all the weeks such that all constraints are satisfied. For example, a distribution should never assign more units to a selling title-week than the number of units that are available for that selling title on that specific week. In addition to determining the number of units that are to be assigned or allocated across all the available selling titles, across one or more of the networks, and across all the weeks, the distribution model utilizes an objective function to determine how much will be actually charged per unit for each selling title and week combination. The objective function maximizes how much the rate effectiveness can be increased.

The product of the allocated units per selling title and week combination, and the demo impressions yields or gives the number of demo impressions per selling title and week combination. The demo CPM is then determined by dividing the budget by the total number of demo impressions across all selling title and week combinations. The product of the allocated units per selling title and week combination, and the target impressions yields or gives the number of target impressions per selling title and week combination. The target CPM is then determined by dividing the budget by the total number of target impressions across all the selling title and weeks combinations.

The distribution model implicitly examines all possible combinations of schedule allocations and rate increments and determines which combination of schedule allocations and rate increments will provide the maximum rate effectiveness increase while at the same time meeting the budget, the target CPM, the demo CPM, and the constraints.

A deal that has a reach component and an audience or demographics component may be referred to as a mixture deal or mixture. In other words, a mixture deal can either be a deal with a reach component and a gross audience (targeted audience) component, or a deal with a reach component and a gross demographic viewership component. A mixture deal is measured by both the total gross viewership (demographics and/or audience), and the unduplicated viewership, that is, reach, according to duration (time) and/or frequency qualifications. A mixture deal may provide a guarantee on only a portion of the deal. For example, a mixture deal may require 2 million impressions (audience component of deal), of which 1M impressions are unique (reach component of deal) based on a specified qualification, and the remaining 1M are not required to be unique.

For reach target which is higher than expected, given the gross audience, the parameters for the dataset may be modified in order to provide the reach target. For example, the flight, allocation, programs, hours of day, network, and/or daypart parameters may be modified in order to provide the reach target. In this regard, the mixture may be provided by placing constraints on the parameters of the reach function. In other words, the reach function from the dataset may be utilized to create allocations across selling title and weeks combinations in order to provide a particular reach, and by placing constraints or bounds on the parameters for the reach function, the resulting reach may be altered.

In accordance with an exemplary embodiment of the disclosure, a high level description of a formulation and steps are provided to determine the unit distribution and pricing for reach and audience mixture by the audience proposal creator 142c. The audience proposal creator 142c may be operable to utilize the following exemplary input parameters, decision variables, and formulation to determine the unit distribution and pricing for reach and audience mixture:

Consider the following input parameters:
  $R_{sw}$=Rate for units of selling title s in week w (may be constant across weeks).
  $\Delta_T$=Percentage reduction in target CPM.
  $C^T$=Baseline for target CPM.
  $\Delta_D$=Maximum percentage increase in demo CPM.
  $C^D$=Baseline for demo CPM.
  B=Advertiser budget for an audience-only deal (i.e., with no reach guarantees).
  $\hat{A}_{sw}^{D}$=Estimated demo impressions on selling title s in week W.
  $\hat{A}_{sw}^{T}$=Estimated target impressions on selling title s in week w.
  $I_{sw}$=Number of available airtime units on selling title s in week w.
  R=Minimum reach to be attained.
  $f(y)$=Reach as a function of several variables that include flight, allocation, gross audience, time attributes, program attributes, etc.

Decision Variables:
  $\rho_{sw}$=Increment in the rate for selling title s in week w.

$x_{sw}$=Number of units to be allocated on selling title s in week w.

Let the incremental rate efficiency (IRE) of a unit distribution and pricing be defined as the sum of the rate increments times the number of units allocated across all selling title-weeks, i.e., the incremental rate efficiency, $$IRE = \Sigma_s \Sigma_w \rho_{sw} x_{sw}.$$

Exemplary steps for determining the unit distribution and pricing may comprise: Step 1. Solving the following formulation to compute or determine the unit distribution and pricing that maximizes the incremental rate efficiency subject to restrictions on demo CPM, target CPM, advertiser's budget, number of units available per selling title-week, as well as other additional constraints. No reach constraints are considered on this step.

Formulation 1

$$\text{Maximize } IRE = \Sigma_s \Sigma_w \rho_{sw} x_{sw}$$

Such that $$\frac{\Sigma_s \Sigma_w (R_{sw} + \rho_{sw}) x_{sw}}{\Sigma_s \Sigma_w A^D_{sw} x_{sw}} \leq (1 + \Delta_D) C^D \quad \text{Constraint 1}$$

$$\frac{\Sigma_s \Sigma_w (R_{sw} + \rho_{sw}) x_{sw}}{\Sigma_s \Sigma_w A^T_{sw} x_{sw}} \leq (1 - \Delta_T) \quad \text{Constraint 2}$$

$$\Sigma_s \Sigma_w (R_{sw} + \rho_{sw}) x_{sw} \leq B \quad \text{Constraint 3}$$

$$x_{sw} \leq l_{sw} \quad \text{Constraint 4}$$

$$[x_{sw}] \in P \quad \text{Constraint 5}$$

$$x_{sw} \in Z^+$$

$$\rho_{sw} \in R^+$$

This formulation maximizes the rate efficiency resulting from the unit distribution and pricing across all selling title-weeks. The first constraint (constraint 1) enforces that the unit distribution and pricing will result in a demo CPM which does not exceed the maximum percentage increase with respect to the baseline demo CPM. The second constraint (constraint 2) enforces that the unit distribution and pricing will result in a target CPM which does not exceed the reduced percentage with respect to the baseline target CPM. The third constraint (constraint 3) enforces that the unit pricing and distribution should not exceed the advertiser's budget. The fourth constraint (constraint 4) establishes that the unit distribution is limited by the number of units that are available for each selling title-week. The fifth constraint (constraint 5) indicates that this formulation can also accommodate other additional constraints that may appear depending on the negotiations with the advertiser. Examples of these additional constraints may include, for example:

- Maximum number of units (total, by network, by selling title, by selling title-week)
- Maximum percentage of total impressions (by network, by selling title)
- Equitable distribution across weeks or skewed distribution based on relative avails across weeks.
- Limits on the rate increments.
- Rate increments proportional to original rates, target impressions, etc.

Finally, variables $x_{sw}$ are defined over the set of nonnegative integers, whereas variables $\rho_{sw}$ are defined over the set of nonnegative real numbers.

It should be noted that no reach constraints are considered on this step, so this is an upper bound on how much the rates may be increased if there were no reach requirements to honor.

Let the maximum incremental rate efficiency determined in this step be denoted by $IRE_O^*$.

Step 2. Solve the following mathematical programming formulation to determine the unit distribution and pricing that maximizes the incremental rate efficiency subject to the same constraints from step 1, plus reach constraints that guarantee that the allocation will provide the desired minimum reach.

Formulation 2

$$\text{Maximize } IRE = \Sigma_s \Sigma_w \rho_{sw} x_{sw}$$

Such that $$\frac{\Sigma_s \Sigma_w (R_{sw} + \rho_{sw}) x_{sw}}{\Sigma_s \Sigma_w A^D_{sw} x_{sw}} \leq (1 + \Delta_D) C^D$$

$$\frac{\Sigma_s \Sigma_w (R_{sw} + \rho_{sw}) x_{sw}}{\Sigma_s \Sigma_w A^T_{sw} x_{sw}} \leq (1 - \Delta_T) C^T$$

$$\Sigma_s \Sigma_w (R_{sw} + \rho_{sw}) x_{sw} \leq B$$

$$x_{sw} \leq l_{sw}$$

$$[x_{sw}] \in P$$

$$f(y) \geq R$$

$$x_{sw} \in Z^+$$

$$\rho_{sw} \in R^+$$

The main difference between formulation 2 and formulation 1, which is utilized in step 1, is the inclusion of reach constraints in formulation 2 to guarantee that the unit distribution meets the desired minimum reach.

Let the maximum incremental rate efficiency determined in this step be denoted by $IRE_R^*$.

Step 3. Compute $\Delta IRE = IRE_O^* - IRE_R^*$. This differential is the opportunity cost of including reach constraints, i.e., it is the incremental rate efficiency that is forgone by including reach guarantees. This opportunity cost is the minimum additional pricing that needs to be charged to the resulting unit distribution, i.e., the minimum reach premium.

Step 4. Distribute $\Delta IRE$ across the unit distribution found in step 2. Let $\delta_{sw}$ be the additional charge for a unit on selling title s in week w, and let $x_{sw}^*$ be the optimal number of units to be allocated on selling title s in week w from step 2. A solution to the following expression may be determined:

$$\Delta IRE = \sum_s \sum_w \delta_{sw} x_{sw}^*$$

Several solutions are possible depending on whether it is desirable to spread the additional charges proportionally to the older rates, the target units, the demo units, etc.

Figure 9:
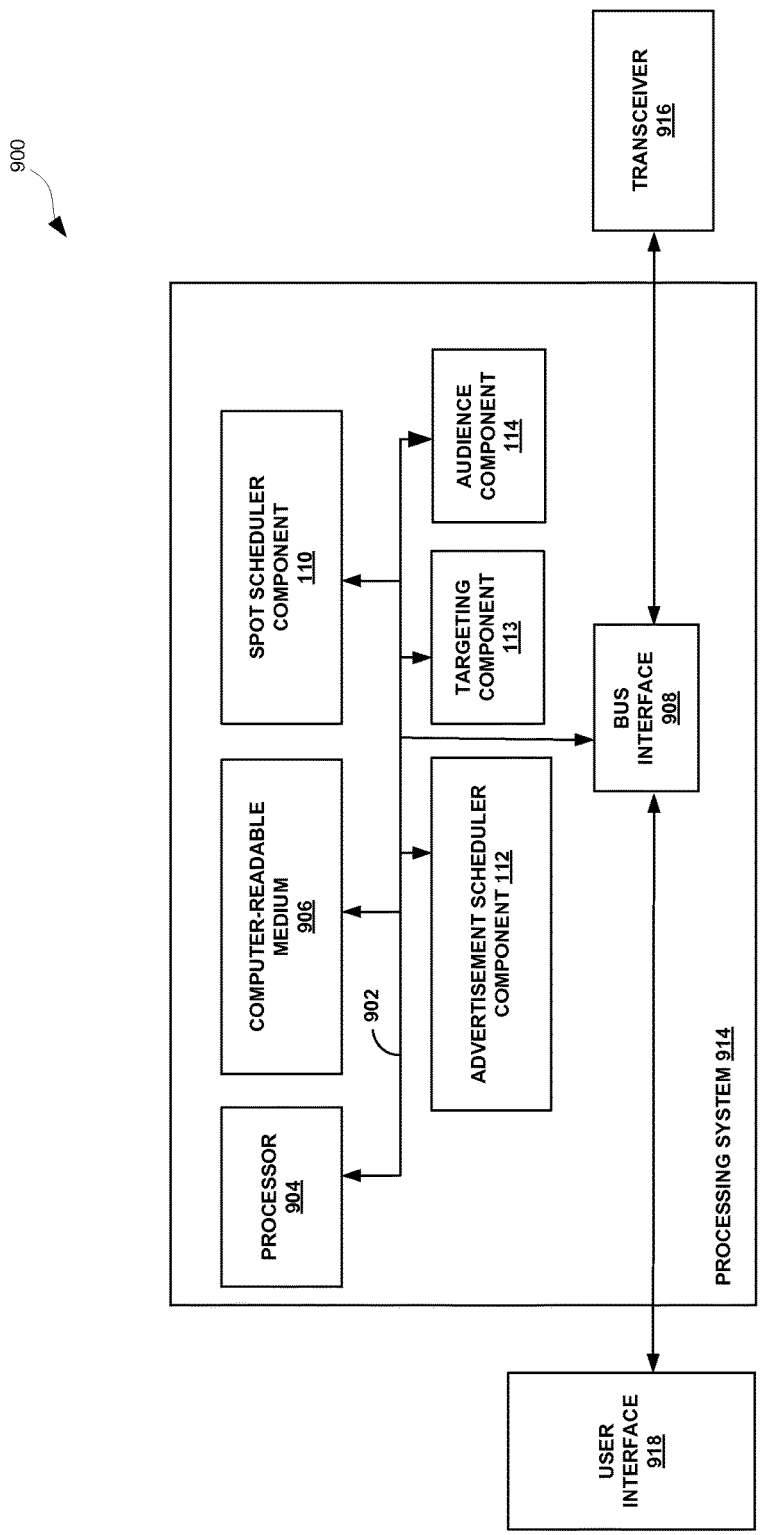

FIG. 9 is a conceptual diagram illustrating an example of a hardware implementation for a television advertisement management system employing a processing system for generation of reach, mixture, and pricing utilizing a framework for audience rating estimation, in accordance with an exemplary embodiment of the disclosure. Referring to FIG. 9, the hardware implementation 900 for the television advertisement management system 100 of FIG. 1A employs a processing system 914 for audience proposal creation and spot scheduling utilizing the framework for audience rating estimation, as described herein. In some examples, the processing system 914 may comprise one or more hardware processors 904, a spot scheduler solver component 110, an advertisement scheduler component 112, a targeting component 113, and an audience component 114.

In this example, the television advertisement management system 100 employing the processing system 914 may be implemented with a bus architecture, represented generally by the bus 902. The bus 902 may include any number of interconnecting buses and bridges depending on the specific implementation of the television advertisement management system 100 and the overall design constraints. The bus 902 links together various circuits including one or more processors, represented generally by the processor 904, computer-readable media, represented generally by the computer-readable medium 906, the spot scheduler component 110, the advertisement scheduler component 112, the targeting component 113, and the audience component 114 (which correspond to the spot scheduler 110, the advertisement scheduler 112, the targeting processor 113, and the audience processor 114, respectively, which are illustrated in illustrated in FIG. 1A), which may be configured to carry out one or more methods or procedures described herein.

The bus interface 908 provides an interface between the bus 902 and a transceiver 916. The transceiver 916 provides a means for communicating via the network 120 with various other apparatus such as the advertiser order generation systems 130a, . . . , 130n and the consumer devices 132a, . . . , 132n (FIG. 1A). The user interface 918 (e.g., keypad, display, speaker, microphone, pointing) may also be provided to enable a user to interact with the television advertisement management system 100 (FIG. 1A). In accordance with an aspect of the disclosure, the user interface 918 may enable user interaction with the television advertisement management system 100. For example, the user interface 918 may be utilized to enter administration (admin) and/or configuration parameters.

The processor 904 may be operable to manage the bus 902 and general processing, including the execution of software stored on the computer-readable medium 906. In accordance with an embodiment of the disclosure, the processor 904 may be operable to control the operation of the television advertisement management system 100 (FIG. 1A), and may be operable to coordinate operation amongst the components therein, as well as with entities external to the television advertisement management system 100. The software, when executed by the processor 904, causes the television advertisement management system 100 to perform the various functions and/or operations described infra for any particular apparatus. The computer-readable medium 906 may also be used for storing data that is manipulated by the processor 904 when executing software.

In an aspect, processor 904, computer-readable medium 906, or a combination of both may be configured or otherwise specially programmed to perform the functionality of the spot scheduler component 110, the advertisement scheduler component 112, the targeting component 113, the audience component 114, (corresponding to the spot scheduler 110, advertisement scheduler 112, targeting processor 113, and audience processor 114, respectively, which are illustrated in FIG. 1A), the television management advertisement management system 100, or various other components described herein. For example, the processor 904, the computer-readable medium 906, or a combination of both may be configured or otherwise specially programmed to perform the functionality of the spot scheduler component 110, the advertisement scheduler component 112, the targeting component 113, the audience component 114, and/or components thereof, etc. described herein (e.g., the operations 160 in FIG. 1C, the operations 300 in FIG. 3, the operations 400 in FIG. 4A, the operations 420 in FIG. 4B, the operations 440 in FIG. 4C, the operations 460 in FIG. 4D, the operations in FIG. 5A-5B, etc.), and the operations 800 in FIG. 8, and/or the like.)

In accordance with an exemplary embodiment of the disclosure, a hardware advertisement management system communicates with a plurality of advertiser order generation systems and electronically receives, via a communication network, deals comprising orders from advertisers. An audience proposal creator 142c in the hardware advertisement management system may generate schedule spot counts for allocations of spots based on a selling title and week combination structure for a pending deal for an advertiser. The audience proposal creator 142c may generate a plurality of simulated spot schedules based on the schedule spot counts for the advertiser for a quarter. The schedule spot counts may be generated based on historical information for possible allocations of the spots. The audience proposal creator 142c may be operable to generate estimates of unduplicated audience for new spot schedules based on corresponding attributes for each of the plurality of simulated spot schedules and generate a proposal for the deal for the advertiser based on the estimates of unduplicated audience. The audience proposal creator 142c may generate the half-hour assignments within the selling title-weeks based on the schedule spot counts, and may randomly sample the half-hour assignments over the quarter to generate the plurality of simulated spot schedules. For each of the plurality of simulated spot schedules, each random schedule resulting from the random sampling within the half-hour assignments over the quarter yields or gives a spot and a corresponding audience. The audience proposal creator 142c may constrain the sampling to allow one unit from any simulated spot schedule to air in a half-hour assignment on any given network. The audience proposal creator 142c may also constrain the selection of the half-hour assignments for unit placement to a specified subset of time, and/or a selling category on networks of interest. The audience proposal creator 142c may be operable to compute or otherwise generate simulated spot statistics for each of the plurality of simulated spot schedules based on the corresponding attributes. The simulated spot statistics may comprise at least one of unduplicated viewers and panel weights, spot schedule gross rating points for target or demographic audience, spot schedule unit count, spot schedule length (in days), spot schedule separation, day of week distribution, time of day distribution, and network and selling title distribution.

In accordance with another aspect of the disclosure, audience proposal creator 142c may determine a target cost per thousand (CPM) baseline and a demographics CPM baseline for the pending deal for the advertiser in which audience spots will be offered, and establish parameters for the pending deal for the advertiser. Constraints to be imposed on the pending deal may be determined by the audience proposal creator 142c based on a target CPM reduction goal, a demographics CPM cap, and established parameters for the pending deal. The audience proposal creator 142c may generate rates by selling title for each selling title of a plurality of selling titles, for each week of a plurality of weeks for a duration of the pending deal, and for each network of a plurality of networks, for the pending deal for the advertiser, based on the constraints. Concurrent with the establishing of the parameters, the determining of the constraints, and the generating of the rates by selling title, the audience proposal creator 142c may acquire target audience rating estimates based on the target CPM reduction goal, and the demographics CPM cap for the plurality of networks. The audience proposal creator 142c may generate a distribution of the audience spots across the plurality of selling titles, the plurality of weeks, and the plurality of networks based at least in part on the target audience rating estimates, reach estimates, a budget for the pending deal, the generated rates by selling title, and available inventory per selling title-weeks, and may generate the proposal based on the distribution.

The audience proposal creator 142c may schedule audience spots across one or more networks for selling title-weeks based on the generated distribution. The parameters for the pending deal may comprise the budget, the target CPM reduction goal, the demographics CPM cap, and demographics rates per selling title to be charged per spot for the pending deal for the advertiser. The audience proposal creator 142c may generate the distribution of the audience spots utilizing a distribution framework, and inputs to the distribution framework comprise the budget, the target CPM reduction goal, the demographics CPM cap, the estimates of unduplicated audience, estimates of gross audience, and one or more of a maximum number of units to be allocated per selling title-week, a limit on the total number of units in the pending deal, a limit on the number of impressions and/or units percentages by network or selling title, a limit on rate increase, and an indication of whether to increase the rates in the same proportion.

The concurrent operation of the audience proposal creator 142c to handle the establishing of the parameters, the determining of the constraints, and the generating of the rates by selling title, and to acquire target audience rating estimates based on the target CPM baseline, and the demographics CPM cap for the plurality of networks, as well as concurrently gather data from dataset of simulated schedules and corresponding attributes, and generate audience reach for new spot schedules enables the television advertisement management system 100 to operate more efficiently since processing resources and memory may be more efficiently utilized by the concurrent operations. The concurrent operation also increases the operating speed (faster computation time without sacrificing accuracy) of the television advertisement management system 100 when generating reach and the distribution of the audience spots across the plurality of selling titles, the plurality of weeks, and the plurality of networks based at least in part on the target audience rating estimates, a budget for the pending deal, the generated rates by selling title, and available inventory per selling title-weeks. The television advertisement management system 100 operates faster and more efficiently to accommodate reach and the distributing of units across selling titles in multiple networks at the same time or concurrently, and can operate to process impressions from more targeted audience segments which are smaller than broader demographics expressed in terms of age and gender. The concurrent operation and use of the data for the framework for target audience rating estimation and demo audience rating estimation, and for the reach prediction framework may utilize less memory than would otherwise be required resulting in much faster processing time.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the operations and/or steps as described herein for targeting and demographics scheduling utilizing the framework for audience rating estimation.

The present invention may also be embodied in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, operations, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, operations, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present invention has been described with reference to certain embodiments, it will be noted understood by, for example, those skilled in the art that various changes and modification could be made and equivalents may be substituted without departing from the scope of the present invention as defined, for example, in the appended claims. In addition, many modifications may be made to adapt a particular situation or material to the teachings of the present invention without departing from its scope. The functions, operations, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated. Therefore, it is intended that the present invention not be limited to the particular embodiment disclosed, but that the present invention will include all embodiments falling within the scope of the appended claims.

What is claimed is:

1. A method, comprising:
   in a hardware advertisement management system configured to communicate with a plurality of advertiser order generation systems and electronically receive, via a communication network, deals comprising orders from advertisers:
   generating schedule spot counts for allocations of spots based on a selling title and week combination structure for a pending deal for an advertiser;
   generating a plurality of simulated spot schedules based at least on the schedule spot counts for the advertiser for a quarter;
   generating estimates of unduplicated audience for new spot schedules based on corresponding attributes of each of the plurality of simulated spot schedules;
   establishing parameters for the pending deal for the advertiser;
   determining constraints to be imposed on the pending deal based on a reduction in a target cost per thousand (CPM) goal, a cap on demographics CPM, and the established parameters for the pending deal;
   acquiring audience rating estimates concurrently with the establishing of the parameters and the determining of the constraints, wherein the acquiring of the audience rating estimates is based on the reduction in the target CPM goal and the cap on the demographics CPM for a plurality of networks;
   generating a distribution of audience spots for the pending deal for the advertiser across at least one of a plurality of selling titles, a plurality of weeks, or the plurality of networks based on at least one of the audience rating estimates, reach estimates, or a budget for the pending deal;
   generating a proposal based on the estimates of unduplicated audience and the distribution; and
   scheduling the audience spots across one or more of the plurality of networks for selling title and weeks combinations based on the generated proposal.

2. The method according to claim 1, further comprising generating the schedule spot counts based on historical information for possible allocations of the spots.

3. The method according to claim 1, further comprising generating half-hour assignments for sampling within the selling title and week combination structure based on the schedule spot counts, wherein each of the half-hour assignments is a period of time assigned to at least one advertising unit over a given time period.

4. The method according to claim 3, further comprising randomly sampling within the half-hour assignments over the quarter to generate the plurality of simulated spot schedules.

5. The method according to claim 4, wherein for each of the plurality of simulated spot schedules, each random schedule resulting from the random sampling within the half-hour assignments over the quarter provides schedule characteristics, schedule statistics, and a corresponding audience.

6. The method according to claim 4, further comprising constraining the random sampling to allow one unit from a simulated spot schedule of the plurality of simulated spot schedules to air in one of the half-hour assignments on a given network of the plurality of networks.

7. The method according to claim 4, further comprising constraining selection of the half-hour assignments for unit placement to at least one of a specified subset of time or a selling category on networks of interest from the plurality of networks.

8. The method according to claim 1, further comprising computing simulated spot statistics for each of the plurality of simulated spot schedules based on the corresponding attributes.

9. The method according to claim 8, wherein the simulated spot statistics comprises at least one of unduplicated viewers and panel weights, spot schedule gross rating points for at least one of a target audience or a demographic audience, spot schedule unit count, spot schedule length, spot schedule separation, day of week distribution, time of day distribution, or network and selling title distribution.

10. The method according to claim 1, comprising:
determining a target CPM baseline and a demographics CPM baseline for the pending deal for the advertiser in which the audience spots are offered;
generating, based on the constraints, rates by selling title for each selling title of the plurality of selling titles, for each week of the plurality of weeks for a duration of the pending deal, for each network of the plurality of networks, and for the pending deal for the advertiser;
acquiring the audience rating estimates concurrently with the generating of the rates by selling title based on the reduction in the target CPM goal, and the cap on the demographics CPM for the plurality of networks; and
generating the distribution of the audience spots across the plurality of selling titles, the plurality of weeks, and the plurality of networks further based on the generated rates by selling title, and available inventory per selling title and weeks combination.

11. The method according to claim 10, wherein the parameters for the pending deal comprise the budget, the reduction in the target CPM goal, the cap on the demographics CPM, and demographics rates per selling title to be charged per spot for the pending deal for the advertiser.

12. The method according to claim 10, further comprising generating the distribution of the audience spots utilizing a distribution framework, wherein inputs to the distribution framework comprise the budget, the reduction in the target CPM goal, the cap on the demographics CPM, estimates of gross audience, and the estimates of unduplicated audience.

13. The method according to claim 12, wherein the inputs to the distribution framework further comprise one or more of a maximum number of units to be allocated per selling title and week combination, a limit on a total number of units in the pending deal, a limit on a number of impressions by one of network or the selling title, a limit on a number of units percentages by one of the network or the selling title, a limit on rate increase, and an indication of whether to increase the rates in a same proportion.

14. The method according to claim 1, wherein the corresponding attributes includes at least one of gross audience, spot separation, allocation, time attributes, or program attributes.

15. A system, comprising:
at least one processor in a hardware advertisement management system, the hardware advertisement management system is configured to communicate with a plurality of advertiser order generation systems and electronically receive, via a communication network, deals comprising orders from advertisers, the at least one processor configured to:
generate schedule spot counts for allocations of spots based on a selling title and week combination structure for a pending deal for an advertiser;
generate a plurality of simulated spot schedules based at least on the schedule spot counts for the advertiser for a quarter;
generate estimates of unduplicated audience for new spot schedules based on corresponding attributes of each of the plurality of simulated spot schedules;
establish parameters for the pending deal for the advertiser;
determine constraints to be imposed on the pending deal based on a reduction in a target cost per thousand (CPM) goal, a cap on demographics CPM, and the established parameters for the pending deal;
acquire audience rating estimates concurrently with the establishment of the parameters and the determination of the constraints, wherein the audience rating estimates is acquired based on the reduction in the target CPM goal and the cap on the demographics CPM for a plurality of networks;
generate a distribution of audience spots for the pending deal for the advertiser across at least one of a plurality of selling titles, a plurality of weeks, or the plurality of networks based on at least one of the audience rating estimates, reach estimates, or a budget for the pending deal;
generate a proposal based on the estimates of unduplicated audience and the distribution; and
schedule the audience spots across one or more of the plurality of networks for selling title and weeks combinations based on the generated proposal.

16. The system according to claim 15, wherein the at least one processor is further configured to generate the schedule spot counts based on historical information for possible allocations of the spots.

17. The system according to claim 15, wherein the at least one processor is further configured to generate half-hour assignments within the selling title and week combination structure based on the schedule spot counts, wherein each of the half-hour assignments is a period of time assigned to at least one advertising unit over a given time period.

18. The system according to claim 17, wherein the at least one processor is further configured to execute a random sampling operation within the half-hour assignments over the quarter to generate the plurality of simulated spot schedules.

19. The system according to claim 18, wherein for each of the plurality of simulated spot schedules, each random schedule generated based on the random sampling operation within the half-hour assignments over the quarter provides schedule characteristics, schedule statistics, and a corresponding audience.

20. The system according to claim 18, wherein the at least one processor is further configured to constrain the random sampling operation to allow one unit from a simulated spot schedule of the plurality of simulated spot schedules to air in one of the half-hour assignments on a given network of the plurality of networks.

21. The system according to claim 18, wherein at least one processor is further configured to constrain selection of the half-hour assignments for unit placement to at least one of a specified subset of time or a selling category on networks of interest from the plurality of networks.

22. The system according to claim 15, wherein the at least one processor is further configured to compute simulated spot statistics for each of the plurality of simulated spot schedules based on the corresponding attributes.

23. The system according to claim 22, wherein the simulated spot statistics comprises at least one of unduplicated viewers and panel weights, spot schedule gross rating points for at least one of a target audience or a demographic audience, spot schedule unit count, spot schedule length, spot schedule separation, day of week distribution, time of day distribution, or network and selling title distribution.

24. The system according to claim 15, wherein the at least one processor is further configured to:

determine a target CPM baseline and a demographics CPM baseline for the pending deal for the advertiser in which the audience spots are offered;

generate, based on the constraints, rates by selling title for each selling title of the plurality of selling titles, for each week of the plurality of weeks for a duration of the pending deal, for each network of the plurality of networks, and for the pending deal for the advertiser;

acquire the audience rating estimates concurrently with the generation of the rates by selling title based on the reduction in the target CPM goal, and the cap on the demographics CPM for the plurality of networks; and generate the distribution of the audience spots across the plurality of selling titles, the plurality of weeks, and the plurality of networks further based on the generated rates by selling title, and available inventory per selling title and weeks combination.

25. The system according to claim 24, wherein the parameters for the pending deal comprise the budget, the reduction in target CPM goal, the cap on the demographics CPM, and demographics rates per selling title to be charged per spot for the pending deal for the advertiser.

26. The system according to claim 24, wherein the at least one processor is further configured to generate the distribution of the audience spots based on a distribution framework, wherein inputs to the distribution framework comprise the budget, the reduction in the target CPM goal, the cap on the demographics CPM, estimates of gross audience, and the estimates of unduplicated audience.

27. The system according to claim 26, wherein the inputs to the distribution framework further comprise one or more of a maximum number of units to be allocated per selling title and week combination, a limit on a total number of units in the pending deal, a limit on a number of impressions by one of network or the selling title, a limit on a number of units percentages by one of the network or the selling title, a limit on rate increase, and an indication of whether to increase the rates in a same proportion.

28. A non-transitory computer-readable medium in a hardware advertisement management system that is configured to communicate with a plurality of advertiser order generation systems and electronically receive, via a communication network, deals comprising orders from advertisers, the non-transitory computer-readable medium comprising computer-executable instructions, which when executed by a processor, causes the processor to execute operations, the operations comprising:

generating schedule spot counts for allocations of spots based on a selling title and week combination structure for a pending deal for an advertiser;

generating a plurality of simulated spot schedules based at least on the schedule spot counts for the advertiser for a quarter;

generating estimates of unduplicated audience for new spot schedules based on corresponding attributes of each of the plurality of simulated spot schedules;

establishing parameters for the pending deal for the advertiser;

determining constraints to be imposed on the pending deal based on a reduction in a target cost per thousand (CPM) goal, a cap on demographics CPM, and the established parameters for the pending deal;

acquiring audience rating estimates concurrently with the establishing of the parameters and the determining of the constraints, wherein the acquiring of the audience rating estimates is based on the reduction in the target CPM goal and the cap on the demographics CPM for a plurality of networks;

generating a distribution of audience spots for the pending deal for the advertiser across at least one of a plurality of selling titles, a plurality of weeks, or the plurality of networks based on at least one of the audience rating estimates, reach estimates, or a budget for the pending deal;

generating a proposal based on the estimates of unduplicated audience and the distribution; and scheduling the audience spots across one or more of the plurality of networks for selling title and weeks combinations based on the generated proposal.

29. The non-transitory computer-readable medium according to claim 28, further comprising generating the schedule spot counts based on historical information for possible allocations of the spots.

30. The non-transitory computer-readable medium according to claim 28, further comprising generating half-hour assignments for sampling within the selling title and week combination structure based on the schedule spot counts, wherein each of the half-hour assignments is a period of time assigned to at least one advertising unit over a given time period.

31. The non-transitory computer-readable medium according to claim 30, further comprising randomly sampling within the half-hour assignments over the quarter to generate the plurality of simulated spot schedules.

32. The non-transitory computer-readable medium according to claim 31, wherein for each of the plurality of simulated spot schedules, each random schedule resulting from the random sampling within the half-hour assignments over the quarter provides schedule characteristics, schedule statistics, and a corresponding audience.

33. The non-transitory computer-readable medium according to claim 31, further comprising constraining the random sampling to allow one unit from a simulated spot schedule of the plurality of simulated spot schedules to air in one of the half-hour assignments on a given network of the plurality of networks.

34. The non-transitory computer-readable medium according to claim 31, further comprising constraining selection of the half-hour assignments for unit placement to at least one of a specified subset of time or a selling category on networks of interest of the plurality of networks.

35. The non-transitory computer-readable medium according to claim 28, further comprising computing simulated spot statistics for each of the plurality of simulated spot schedules based on the corresponding attributes.

36. The non-transitory computer-readable medium according to claim 35, wherein the simulated spot statistics comprises at least one of unduplicated viewers and panel weights, spot schedule gross rating points for at least one of a target audience or a demographic audience, spot schedule unit count, spot schedule length, spot schedule separation, day of week distribution, time of day distribution, or network and selling title distribution.

37. The non-transitory computer-readable medium according to claim 28, further comprising:

determining a target CPM baseline and a demographics CPM baseline for the pending deal for the advertiser in which the audience spots are offered;

generating, based on the constraints, rates by selling title for each selling title of the plurality of selling titles, for each week of the plurality of weeks for a duration of the pending deal, for each network of the plurality of networks, and for the pending deal for the advertiser;
acquiring the audience rating estimates concurrently with the generating of the rates by selling title based on the reduction in the target CPM goal, and the cap on the demographics CPM for the plurality of networks; and
generating the distribution of the audience spots across the plurality of selling titles, the plurality of weeks, and the plurality of networks further based on the generated rates by selling title, and available inventory per selling title and weeks combination.

38. The non-transitory computer-readable medium according to claim 37, wherein the parameters for the pending deal comprise the budget, the reduction in the target CPM goal, the cap on the demographics CPM, and demographics rates per selling title to be charged per spot for the pending deal for the advertiser.

39. The non-transitory computer-readable medium according to claim 37, further comprising generating the distribution of the audience spots utilizing a distribution framework, wherein inputs to the distribution framework comprise the budget, the reduction in the target CPM goal, the cap on the demographics CPM, estimates of gross audience, and the estimates of unduplicated audience.

40. The non-transitory computer-readable medium according to claim 39, wherein the inputs to the distribution framework further comprise one or more of a maximum number of units to be allocated per selling title and week combination, a limit on a total number of units in the pending deal, a limit on a number of impressions by one of network or the selling title, a limit on a number of units percentages by one of the network or the selling title, a limit on rate increase, and an indication of whether to increase the rates in a same proportion.

41. A method, comprising:
in a hardware advertisement management system configured to communicate with a plurality of advertiser order generation systems and electronically receive, via a communication network, deals comprising orders from advertisers:
generating schedule spot counts for allocations of spots based on a selling title and week combination structure for a pending deal for an advertiser;
generating a plurality of simulated spot schedules based at least on the schedule spot counts for the advertiser for a quarter;
generating estimates of unduplicated audience for new spot schedules based on corresponding attributes of each of the plurality of simulated spot schedules;
determining a target cost per thousand (CPM) baseline and a demographics CPM baseline for the pending deal for the advertiser in which audience spots are offered;
establishing parameters for the pending deal for the advertiser;
determining constraints to be imposed on the pending deal based on a reduction in a target CPM goal, a cap on demographics CPM, and the established parameters for the pending deal;
generating, based on the constraints, rates by selling title for each selling title of a plurality of selling titles, for each week of a plurality of weeks for a duration of the pending deal, and for each network of a plurality of networks, for the pending deal for the advertiser;
concurrent with the establishing of the parameters, the determining of the constraints, and the generating of the rates by selling title, acquiring target audience rating estimates based on the reduction in the target CPM goal, and the cap on the demographics CPM for the plurality of networks;
generating a distribution of the audience spots across the plurality of selling titles, the plurality of weeks, and the plurality of networks based at least in part on the target audience rating estimates, reach estimates, a budget for the pending deal, the generated rates by selling title, and available inventory per selling title and weeks combination; and
generating a proposal based on the estimates of unduplicated audience and based on the distribution.

42. The method according to claim 41, further comprising generating the schedule spot counts based on historical information for possible allocations of the spots.

43. The method according to claim 41, further comprising generating half-hour assignments for sampling within the selling title and week combination structure based on the schedule spot counts, wherein each of the half-hour assignments is a period of time assigned to at least one advertising unit over a given time period.

44. The method according to claim 43, further comprising randomly sampling within the half-hour assignments over the quarter to generate the plurality of simulated spot schedules.

45. The method according to claim 44, wherein for each of the plurality of simulated spot schedules, each random schedule resulting from the random sampling within the half-hour assignments over the quarter provides schedule characteristics, schedule statistics, and a corresponding audience.

46. The method according to claim 44, further comprising constraining the random sampling to allow one unit from a simulated spot schedule of the plurality of simulated spot schedules to air in one of the half-hour assignments on a given network of the plurality of networks.

47. The method according to claim 44, further comprising constraining selection of the half-hour assignments for unit placement to at least one of a specified subset of time or a selling category on networks of interest from the plurality of networks.

48. The method according to claim 41, further comprising computing simulated spot statistics for each of the plurality of simulated spot schedules based on the corresponding attributes.

49. The method according to claim 48, wherein the simulated spot statistics comprises at least one of unduplicated viewers and panel weights, spot schedule gross rating points for at least one of a target audience or a demographic audience, spot schedule unit count, spot schedule length, spot schedule separation, day of week distribution, time of day distribution, or network and selling title distribution.

50. The method according to claim 41, wherein the parameters for the pending deal comprise the budget, the reduction in the target CPM goal, the cap on the demographics CPM, and demographics rates per selling title to be charged per spot for the pending deal for the advertiser.

51. The method according to claim 41, further comprising generating the distribution of the audience spots utilizing a distribution framework, wherein inputs to the distribution framework comprise the budget, the reduction in the target CPM goal, the cap on the demographics CPM, estimates of gross audience, and the estimates of unduplicated audience.

52. The method according to claim 51, wherein the inputs to the distribution framework further comprise one or more of a maximum number of units to be allocated per selling title and week combination, a limit on a total number of units in the pending deal, a limit on a number of impressions percentages by one of network or the selling title, a limit on a number of units percentages by one of the network or the selling title, a limit on rate increase, and an indication of whether to increase the rates in a same proportion.

53. The method according to claim 41, wherein the corresponding attributes includes at least one of gross audience, spot separation, allocation, time attributes, or program attributes.

54. A system, comprising:
at least one processor in a hardware advertisement management system, the hardware advertisement management system configured to communicate with a plurality of advertiser order generation systems and electronically receive, via a communication network, deals comprising orders from advertisers, the at least one processor configured to:
generate schedule spot counts for allocations of spots based on a selling title and week combination structure for a pending deal for an advertiser;
generate a plurality of simulated spot schedules based at least on the schedule spot counts for the advertiser for a quarter;
generate estimates of unduplicated audience for new spot schedules based on corresponding attributes of each of the plurality of simulated spot schedules;
determine a target cost per thousand (CPM) baseline and a demographics CPM baseline for the pending deal for the advertiser in which audience spots are offered;
establish parameters for the pending deal for the advertiser;
determine constraints to be imposed on the pending deal based on a reduction in a target CPM goal, a cap on demographics CPM, and the established parameters for the pending deal;
generate, based on the constraints, rates by selling title for each selling title of a plurality of selling titles, for each week of a plurality of weeks for a duration of the pending deal, and for each network of a plurality of networks, for the pending deal for the advertiser;
concurrent with the establishment of the parameters, the determination of the constraints, and the generation of the rates by selling title, acquire target audience rating estimates based on the reduction in the target CPM goal, and the cap on the demographics CPM for the plurality of networks;
generate a distribution of the audience spots across the plurality of selling titles, the plurality of weeks, and the plurality of networks based at least in part on the target audience rating estimates, reach estimates, a budget for the pending deal, the generated rates by selling title, and available inventory per selling title and weeks combination; and
generate a proposal based on the estimates of unduplicated audience and based on the distribution.

55. The system according to claim 54, wherein the at least one processor is further configured to generate the schedule spot counts based on historical information for possible allocations of the spots.

56. The system according to claim 54, wherein the at least one processor is further configured to generate half-hour assignments within the selling title and week combination structure based on the schedule spot counts, wherein each of the half-hour assignments is a period of time assigned to at least one advertising unit over a given time period.

57. The system according to claim 56, wherein the at least one processor is further configured to execute a random sampling operation within the half-hour assignments over the quarter to generate the plurality of simulated spot schedules.

58. The system according to claim 57, wherein for each of the plurality of simulated spot schedules, each random schedule generated based on the random sampling operation within the half-hour assignments over the quarter provides schedule characteristics, schedule statistics, and a corresponding audience.

59. The system according to claim 57, wherein the at least one processor is further configured to constrain the random sampling operation to allow one unit from a simulated spot schedule of the plurality of simulated spot schedules to air in one of the half-hour assignments on a given network of the plurality of networks.

60. The system according to claim 57, wherein at least one processor is further configured to constrain selection of the half-hour assignments for unit placement to at least one of a specified subset of time or a selling category on networks of interest from the plurality of networks.

61. The system according to claim 24, wherein the at least one processor is further configured to compute simulated spot statistics for each of the plurality of simulated spot schedules based on the corresponding attributes.

62. The system according to claim 61, wherein the simulated spot statistics comprises at least one of unduplicated viewers and panel weights, spot schedule gross rating points for at least one of a target audience or a demographic audience, spot schedule unit count, spot schedule length, spot schedule separation, day of week distribution, time of day distribution, or network and selling title distribution.

63. The system according to claim 24, wherein the parameters for the pending deal comprise the budget, the reduction in target CPM goal, the cap on the demographics CPM, and demographics rates per selling title to be charged per spot for the pending deal for the advertiser.

64. The system according to claim 24, wherein the at least one processor is further configured to generate the distribution of the audience spots based on a distribution framework, wherein inputs to the distribution framework comprise the budget, the reduction in the target CPM goal, the cap on the demographics CPM, estimates of gross audience, and the estimates of unduplicated audience.

65. The system according to claim 64, wherein the inputs to the distribution framework further comprise one or more of a maximum number of units to be allocated per selling title and week combination, a limit on a total number of units in the pending deal, a limit on a number of impressions by one of network or the selling title, a limit on a number of units percentages by one of the network or the selling title, a limit on rate increase, and an indication of whether to increase the rates in a same proportion.

66. The system according to claim 54, wherein the corresponding attributes includes at least one of gross audience, spot separation, allocation, time attributes, or program attributes.

67. A non-transitory computer-readable medium in a hardware advertisement management system that is configured to communicate with a plurality of advertiser order generation systems and electronically receive, via a communication network, deals comprising orders from advertisers, the non-transitory computer-readable medium comprising computer-executable instructions, which when executed by a processor, causes the processor to execute operations, the operations comprising:

generating schedule spot counts for allocations of spots based on a selling title and week combination structure for a pending deal for an advertiser;

generating a plurality of simulated spot schedules based at least on the schedule spot counts for the advertiser for a quarter;

generating estimates of unduplicated audience for new spot schedules based on corresponding attributes of each of the plurality of simulated spot schedules;

determining a target cost per thousand (CPM) baseline and a demographics CPM baseline for the pending deal for the advertiser in which audience spots are offered;

establishing parameters for the pending deal for the advertiser;

determining constraints to be imposed on the pending deal based on a reduction in a target CPM goal, a cap on demographics CPM, and the established parameters for the pending deal;

generating, based on the constraints, rates by selling title for each selling title of a plurality of selling titles, for each week of a plurality of weeks for a duration of the pending deal, and for each network of a plurality of networks, for the pending deal for the advertiser;

concurrent with the establishing of the parameters, the determining of the constraints, and the generating of the rates by selling title, acquiring target audience rating estimates based on the reduction in the target CPM goal, and the cap on the demographics CPM for the plurality of networks;

generating a distribution of the audience spots across the plurality of selling titles, the plurality of weeks, and the plurality of networks based at least in part on the target audience rating estimates, reach estimates, a budget for the pending deal, the generated rates by selling title, and available inventory per selling title and weeks combination; and generating a proposal based on the estimates of unduplicated audience and based on the distribution.

68. The non-transitory computer-readable medium according to claim 67, further comprising generating the schedule spot counts based on historical information for possible allocations of the spots.

69. The non-transitory computer-readable medium according to claim 67, further comprising generating half-hour assignments for sampling within the selling title and week combination structure based on the schedule spot counts, wherein each of the half-hour assignments is a period of time assigned to at least one advertising unit over a given time period.

70. The non-transitory computer-readable medium according to claim 69, further comprising randomly sampling within the half-hour assignments over the quarter to generate the plurality of simulated spot schedules.

71. The non-transitory computer-readable medium according to claim 70, wherein for each of the plurality of simulated spot schedules, each random schedule resulting from the random sampling within the half-hour assignments over the quarter provides schedule characteristics, schedule statistics, and a corresponding audience.

72. The non-transitory computer-readable medium according to claim 70, further comprising constraining the random sampling to allow one unit from a simulated spot schedule of the plurality of simulated spot schedules to air in one of the half-hour assignments on a given network of the plurality of networks.

73. The non-transitory computer-readable medium according to claim 70, further comprising constraining selection of the half-hour assignments for unit placement to at least one of a specified subset of time or a selling category on networks of interest of the plurality of networks.

74. The non-transitory computer-readable medium according to claim 67, further comprising computing simulated spot statistics for each of the plurality of simulated spot schedules based on the corresponding attributes.

75. The non-transitory computer-readable medium according to claim 74, wherein the simulated spot statistics comprises at least one of unduplicated viewers and panel weights, spot schedule gross rating points for at least one of a target audience or a demographic audience, spot schedule unit count, spot schedule length, spot schedule separation, day of week distribution, time of day distribution, or network and selling title distribution.

76. The non-transitory computer-readable medium according to claim 67, wherein the parameters for the pending deal comprise the budget, the reduction in the target CPM goal, the cap on the demographics CPM, and demographics rates per selling title to be charged per spot for the pending deal for the advertiser.

77. The non-transitory computer-readable medium according to claim 67, further comprising generating the distribution of the audience spots utilizing a distribution framework, wherein inputs to the distribution framework comprise the budget, the reduction in the target CPM goal, the cap on the demographics CPM, estimates of gross audience, and the estimates of unduplicated audience.

78. The non-transitory computer-readable medium according to claim 77, wherein the inputs to the distribution framework further comprise one or more of a maximum number of units to be allocated per selling title and week combination, a limit on a total number of units in the pending deal, a limit on a number of impressions by one of network or the selling title, a limit on a number of units percentages by one of the network or the selling title, a limit on rate increase, and an indication of whether to increase the rates in a same proportion.

79. The non-transitory computer-readable medium according to claim 67, wherein the corresponding attributes includes at least one of gross audience, spot separation, allocation, time attributes, or program attributes.

* * * * *